(12) United States Patent
See

(10) Patent No.: US 7,430,204 B2
(45) Date of Patent: Sep. 30, 2008

(54) INTERNET PROTOCOL TUNNELLING USING TEMPLATES

(75) Inventor: David Kenji See, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 11/087,748

(22) Filed: Mar. 24, 2005

(65) Prior Publication Data

US 2005/0232277 A1 Oct. 20, 2005

(30) Foreign Application Priority Data

Mar. 26, 2004 (AU) .............................. 2004901658

(51) Int. Cl.
*H04L 12/28* (2006.01)
*H04L 12/56* (2006.01)

(52) U.S. Cl. ...................... 370/392; 370/401

(58) Field of Classification Search ................ 370/389, 370/392, 401

See application file for complete search history.

(56) References Cited

U.S. PATENT DOCUMENTS

| | | | |
|---|---|---|---|
| 5,937,169 A | 8/1999 | Connery et al. | 395/200.8 |
| 6,526,446 B1 | 2/2003 | Yang et al. | 709/230 |
| 2002/0087732 A1 | 7/2002 | Boucher et al. | 709/250 |
| 2002/0095519 A1 | 7/2002 | Philbrick et al. | 709/250 |
| 2003/0152078 A1 | 8/2003 | Henderson et al. | |
| 2004/0225895 A1* | 11/2004 | Mukherjee et al. | 713/201 |

OTHER PUBLICATIONS

S. Kent, et al. "IP Authentication Header" IETF RFC 2402, Nov. 1998.

* cited by examiner

*Primary Examiner*—Ronald Abelson
(74) *Attorney, Agent, or Firm*—Fitzpatrick, Cella, Harper & Scinto

(57) ABSTRACT

A method and apparatus for processing IP packets is disclosed. The method comprises defining sets of packet fields referred to as templates (in method steps 1101-1102), storing the templates in a memory, determining (in a step 1104) if a current IP packet is intended to be processed, identifying (in the step 1104) the process to be applied to the current IP packet, selecting, depending on an attribute of the identified process, at least one of the stored templates, and operating (in a step 1107) upon the current IP packet, using the templates, to form a processed IP packet.

9 Claims, 19 Drawing Sheets

INTERNET PROTOCOL TUNNELLING USING TEMPLATES

FIELD OF THE INVENTION

The present invention relates generally to computer networks, and in particular, to architectures for processing Internet protocol (IP) packets.

BACKGROUND

IP is a common data standard used by computer systems to exchange data over a network. Using the IP standard, data is transferred in packets from a source computer system to a destination computer system. Data can be transferred directly between the two computers, or indirectly, being passed through other computer systems before arriving at the destination computer system. IP version 4 (IPv4) and IP version 6 (IPv6) are two popular versions of the IP communication standard. IPv4 and IPv6 differ in their terminology and implementations, but the two standards share many equivalent features. The IP tunnelling technique disclosed in this description applies to IPv4 and IPv6, and accordingly terminology from both the IPv4 and IPv6 standards is used where appropriate. The Internet protocol security standard (IPsec) is an IP standard that deals with authentication and confidentiality features for IP data, using cryptographic processing. Processing systems for IP packets preferably support packet encapsulation (ie., tunnelling) as well as IPsec processing.

IP packets contain a header, followed by a payload. In IPv4, "options", if present, appear as part of the IP header. In IPv6, the IP header can be followed by IP extension headers. IPv4 options and IPv6 IP extension headers can, for the purposes of this description, be considered to be functionally equivalent.
p In some circumstances, an IP packet can be transported as the payload of an encapsulating IP packet. The encapsulating packet is called a "tunnel packet". The forwarding path between the source and destination of the tunnel packet is called a tunnel. The technique of encapsulating a packet and sending it from a source to a destination is called tunneling. Once tunneled (formed), a tunnel packet is provided with a new IP header and new IP extension headers, that are respectively referred to as an outer IP header and outer IP extension headers. The header and extension headers of the encapsulated packet are referred to as the inner IP header and the inner IP extension headers. The outer IP header may be constructed by copying some fields from the inner IP header, however, the construction of the outer IP extension headers is not necessarily directly related to the inner IP extension headers.

Typical IP processing systems are implemented in software. As IP data rates increase, this software implementation approach is sometimes too slow for some applications. If the processing methods typically used in software systems are directly mapped to a hardware implementation, then the speed of the resultant hardware system is typically greater than the corresponding software systems, however, such hardware implementations would be complex and inflexible.

SUMMARY

It is an object of the present invention to substantially overcome, or at least ameliorate, one or more disadvantages of existing arrangements.

Disclosed are arrangements which predefine sets of packet fields (referred to as "templates") that can be used in processing IP packets. This is referred to as the IP tunneling approach in this description. The approach is particularly useful when the packet processing involves tunneling and authentication. These pre-defined templates, such as extension headers for example, are constructed and stored for later use when processing IP packets. The templates are used to rapidly perform at least part of the encapsulation and/or authentication process(es), to form what is referred to as an "augmented packet". The remainder of the encapsulation and/or authentication process(es), if required, can, if desired, be performed in a conventional fashion or using further application(s) of the tunneling approach.

The tunneling approach makes higher demands on memory resources than previous techniques, however it reduces the processing load required to process the IP packets. This tunneling approach can thus provide increases in IP processing speed, whether implemented in software or hardware. Even greater speed advantages can be obtained by increasing the proportionate use of hardware in an IP processing system using the IP tunneling approach and pre-defined packet fields.

According to a first aspect of the present invention, there is provided a method of processing IP packets, the method comprising the steps of:

defining a plurality of sets of packet fields;

storing the sets of defined packet fields in a memory;

determining if a current IP packet is intended to be processed;

identifying the process to be applied to the current IP packet;

selecting, depending on an attribute of the identified process, at least one of the stored sets of defined packet fields; and operating upon the current IP packet, using the at least one set of selected packet fields, to form a processed IP packet.

According to another aspect of the present invention, there is provided an apparatus for processing IP packets, the apparatus comprising:

means for defining a plurality of sets of packet fields;

means for storing the sets of defined packet fields in a memory;

means for determining if a current IP packet is intended to be processed;

means for identifying the process to be applied to the current IP packet;

means for selecting, depending on an attribute of the identified process, at least one of the stored sets of defined packet fields; and p means for operating upon the current IP packet, using the at least one set of selected packet fields, to form a processed IP packet.

According to another aspect of the present invention, there is provided a computer program product having a computer readable medium having a computer program recorded therein for directing a processor to process IP packets, said computer program comprising:

code for defining a plurality of sets of packet fields;

code for storing the sets of defined packet fields in a memory;

code for determining if a current IP packet is intended to be processed;

code for identifying the process to be applied to the current IP packet;

code for selecting, depending on an attribute of the identified process, at least one of the stored sets of defined packet fields; and code for operating upon the current IP packet, using the at least one set of selected packet fields, to form a processed IP packet.

According to another aspect of the present invention, there is provided a computer program for directing a processor to process IP packets, said computer program comprising:

code for defining a plurality of sets of packet fields;
 code for storing the sets of defined packet fields in a memory;
 code for determining if a current IP packet is intended to be processed;
 code for identifying the process to be applied to the current IP packet; code for selecting, depending on an attribute of the identified process, at least one of the stored sets of defined packet fields; and
 code for operating upon the current IP packet, using the at least one set of selected packet fields, to form a processed IP packet.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
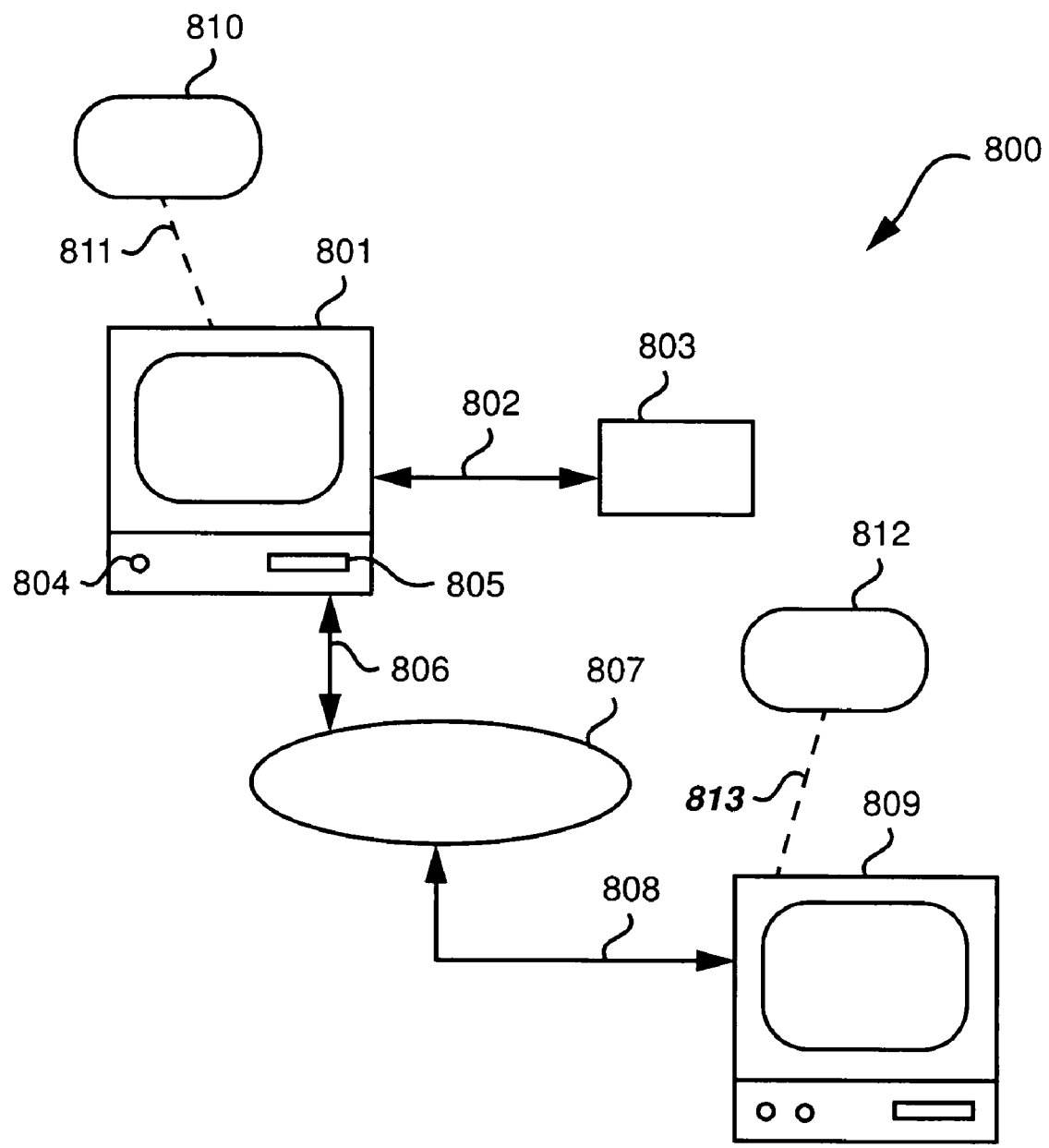
FIG. 1 shows a block diagram of a system upon which the disclosed IP tunneling approach can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of processes or devices which form public knowledge through their respective publication and/or use. Such should not be interpreted as a representation by the present inventor(s) or patent applicant that such processes or devices in any way form part of the common general knowledge in the art.

FIG. 1 shows a block diagram of a system upon which the disclosed IP tunneling approach can be practiced. A source computer 801 is connected as depicted by an arrow 802 to an IP hardware module 803. As will be described in relation to FIG. 2, the IP hardware module 803 comprises both hardware and software elements. Software 810 runs, as depicted by a dashed line 811, on the computer 801. The source computer 801 is connected, as depicted by an arrow 806, to a network 807. A destination computer 809 is connected, as depicted by an arrow 808, to the network 807. Software 812 runs, as depicted by a dashed line 813, on the destination computer 809.

The disclosed tunneling approach is used by the source computer 801, in conjunction with the software 810 and the IP hardware module 803, to process IP packets generated by the software 810 for transmission across the network 807 to the destination computer 809.

While FIG. 1 shows general purpose computers 801 and 809 as well as a separate IP hardware module 803, the tunneling approach can also be used in embedded computer systems. In such systems (not shown), which can include multi-function office equipment (such as devices integrating printer, scanner, copier, and facsimile capability), and network routers, the processing required to handle IP and IPsec may be done in software (using an embedded processor and embedded software) or in hardware. In such systems, the data to be sent over IP may come from another embedded computer system, such as a (hardware) scanner for example.

Figure 2:
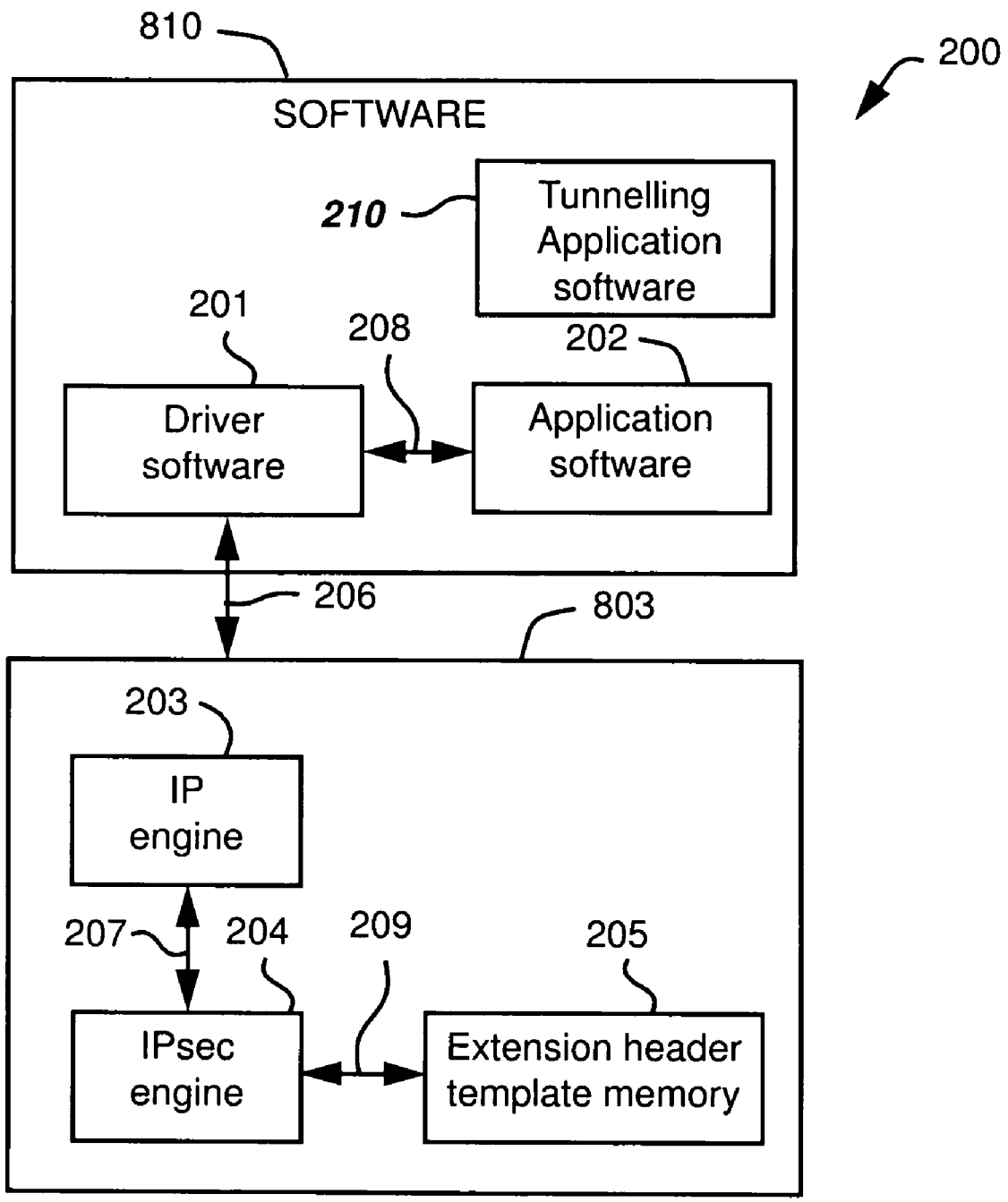
FIG. 2 shows functional elements for the source computer and IP processing module of FIG. 1.

FIG. 2 shows functional elements of the source computer 801 and the IP module 803 of FIG. 1. The software of the source computer 810 comprises a driver software module 201 which interacts, as depicted by an arrow 208, with application software 202. The driver software module 201 interacts, as depicted by an arrow 206, with the IP hardware module 803. This description assumes a particular distribution of functionality between the source computer 801 and the IP hardware module 803 of FIG. 1. However, this is for illustration only, and other distributions of functionality can also be used. The IP hardware module 803 comprises an IP engine 203 that interacts, as depicted by an arrow 207 with an IPsec engine 204. The IPsec engine 204 interacts, as depicted by an arrow 209, with an extension header template memory 205. The software of the computer 810 also includes a tunneling application software module 210 that is described in more detail in regard to FIG. 4A.

The application software 202 is the source of the data that is to be transferred from the source computer 801 to the destination computer 809 over the network 807. The application software 202 transfers this data to the driver software 201 which communicates with the IP hardware module 803.

The IP engine 203 constructs IP packets from the data generated by the application software 202 in order to package the data for transmission over the network 807. Prior to transmitting the packets over the network 807, the IP engine 203 passes each packet to the IPsec engine 204, for IPsec processing. The IPsec engine 204 determines which, if any, IPsec processing is required for the particular packet being considered. If IP tunneling is to be applied, and if an outer IP extension header is required, then the appropriate outer IP extension header is retrieved from the IP extension header template memory 205. It is noted that in the case of IPv4, instead of an outer IP extension header being required after the outer IP header, option(s) are required within the IP header. This is, however, an equivalent requirement from the perspective of the present system.

The IPsec engine 204 inserts a copy of the IP extension header, retrieved from the memory 205, into the IP packet. This insertion possibly modifies some parts of the copied IP extension header before inserting the modified copy into the IP packet. The IPsec engine 204 then processes the packet by, for example, generating an authentication header. After the IPsec engine 204 completes processing of the packet, the packet is returned to the IP engine 203 for transmission across the network 807.

The IP extension header templates are stored beforehand in the IP extension header template memory 205 by the driver software 201, possibly using information from the application software 202 and/or the tunneling software application 210. The IP extension header templates are typically generated when the application 202 (see FIG. 2) is started, since the application may supply information that is used in the templates.

Figure 3:
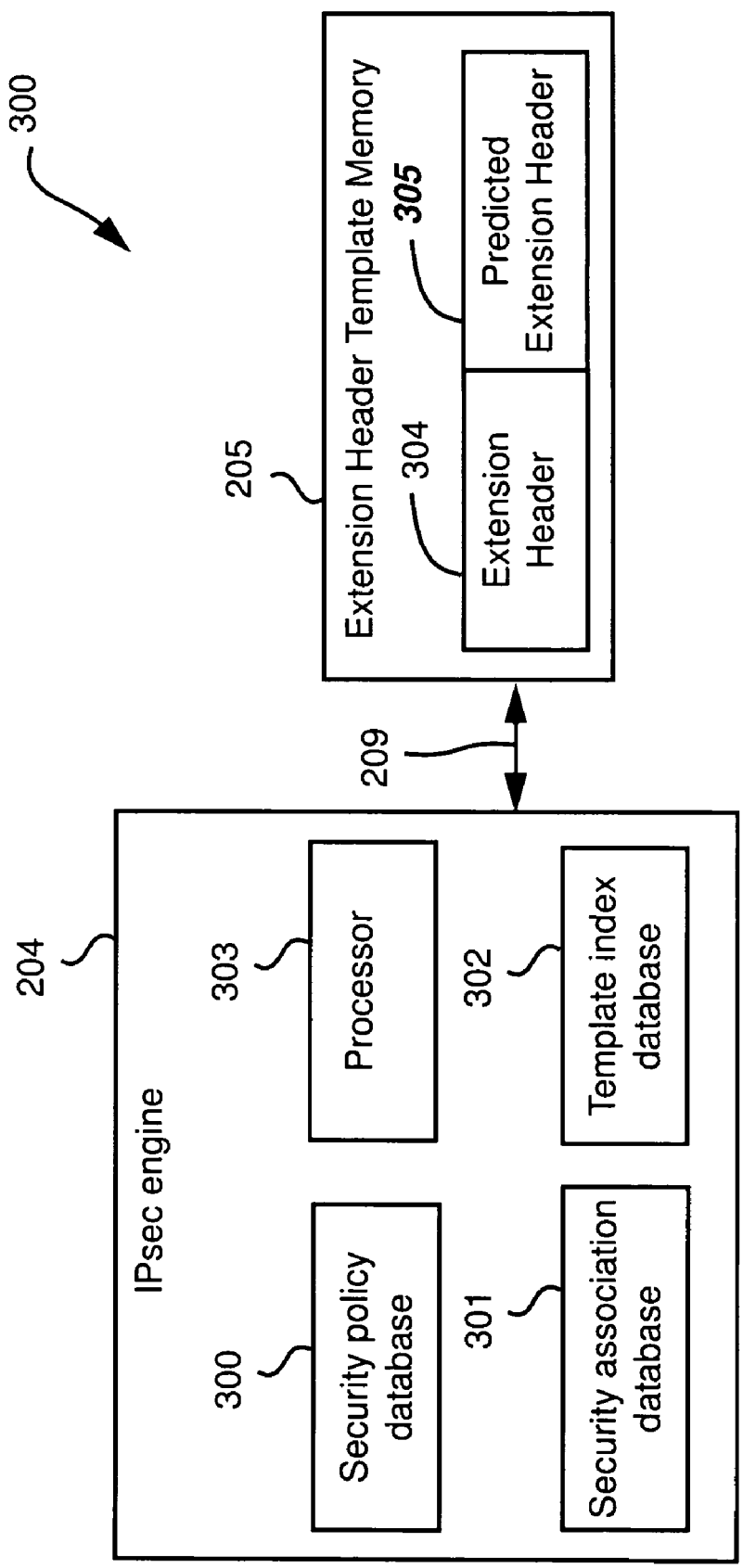
FIG. 3 shows functional elements of the IPsec engine and the extension header template memory of FIG. 2.

FIG. 3 shows functional elements of the IPsec engine 204 and the extension header template memory 205 of FIG. 2. The IPsec engine 204 comprises a security policy database 300, a security association database 301, a template index database 302 and a processor 303. The IPsec engine 204 interacts, as depicted by the arrow 209, with the extension header template memory 205. This memory 205 is partitioned into two memory regions, namely an extension header region 304 and a predicted extension header region 305.

Upon receipt of the IP packet for IPsec processing prior to transmission across the network 807, the IPsec engine 204 consults the security policy database 300 in order to determine what IPsec processing, if any, is required by the packet. If IPsec processing is required, the IPsec engine 204, via the processor 303, consults the security association database 301 in order to determine the cryptographic parameters, such as keys, algorithms and so on, required to perform the IPsec processing.

Thus, for example, the IPsec parameters extracted by the IPsec engine 204 from the security association database 301 may specify tunnel mode, which then requires a new IP header to be constructed for the packet in question. In this case, the new IP packet may require one or more outer IP extension headers, which in the described arrangement are constructed based upon templates that are stored in the IP extension header template memory 205. In order to determine which IP extension header template(s) should be used, indices into the IP extension header template memory 205 for the required IP extension header template(s) may be stored in the security association database 301. These indices would specify the IP extension header templates to be extracted from the extension header template memory 205, as well as the order in which the IP extension headers that are derived from the IP extension header templates would appear in the final tunnel packet. Alternatively, the indices of the required IP extension header template(s) can be stored in a separate template index database 302.

The IP extension header template memory 205 contains the templates for the IP extension headers. An IP extension header template may be used by more than one IPsec security association. Each IPsec security association may use more than one IP extension header template.

A "Security Association" (as defined in RFC 2408 from the Internet Engineering Task Force) is a relationship between two or more entities that describes how the entities will utilize security services to communicate securely. A security association applies to uni-directional dataflow from a source computer system to a destination computer system. For bi-directional dataflow between two computer systems, two Security Associations are required, one in each direction. Selectors that form part of the Security Association may be used to select only certain IP datagrams from the dataflow, to which the Security Association applies. Each Security Association specifies a single cryptographic processing operation that is to be applied to the dataflow. A sequence of Security Associations may be applied to a dataflow, in order to perform multiple cryptographic processing operations on that dataflow. The specification of a cryptographic processing step may include:

the security protocol to be applied (eg: authentication header (AH), or encapsulating security payload (ESP));

the mode of operation (transport mode, or tunnel mode); p1 the cryptographic algorithm to be used (eg: HMAC with MD 5, HMAC with SHA-1, AES, DES);

the key value for the cryptographic algorithm;

an initial value for the cryptographic algorithm;

a sequence number, a monotonically increasing number possibly used to detect potentially malicious "replay" of previously sent datagrams;

a count of the maximum number of bytes to which the Security Association may be applied, before having to be replaced by a new Security Association;

a time when the Security Association expires, after which the association must be replaced by a new Security Association.

Use of a Security Association may require that certain parameters be updated, including:

increment of the sequence number;

update of the byte count

Typically, a security association is created when an application first attempts to send a packet to a destination computer system, and the security policy for that connection specifies that an IPsec operation is required.

The process of establishing a security association is complex, and may take some time, because of the generation and exchange of cryptographic keys. Thus, parts of the process of establishing a security association may be performed by software in the source and destination computer systems.

Typically, an extension header template is created when the corresponding security association is created. This may be performed by the same software in the source computer system that is used to establish the security association.

For example, if a security policy specifies that packets for a particular connection should be authenticated and tunneled through a series of known IP addresses, a routing extension header template would be created when the corresponding authentication security association is created. The security association would be linked to the header template so that the template can be used whenever the security association is invoked on a packet.

If subsequent security associations are established that require packets to be augmented with the same extension header as an existing security association, it is possible for these security associations to use the existing extension header template. In this case, these subsequent security associations would be linked to the same header template. Alternatively, new extension header templates may be created for each subsequent security association.

Continuing with the example, the security association may specify that IPv4 packets should be tunneled over an IPv6 network. In this case, an IPv6 "Type 0" routing extension header is used to specify the route of the tunneled packets. The extension header template is created with the known IP addresses of the specified route. This route is typically known or determined when the security association is created, and thus the extension header template is invariant for the lifetime of the security association.

Since the original IPv4 packet is being tunneled over an IPv6 network, an IPv6 base header, the "Type 0" routing extension header (from the template memory), and an IPsec authentication header, will be prepended to the original IPv4 packet.

The authentication data in the IPsec authentication header will be calculated using parts of the IPv6 base header, the "Type 0" routing extension header, parts of the IPsec authentication header, and the original IPv4 packet. However, the authentication data are calculated using these headers as they will appear at the destination computer system, not as they appear at the source computer system. In particular, the "Type 0" routing extension header will change as the tunneled packet is transferred over the IPv6 network. Thus, the authentication data in the IPsec authentication header will be calculated using the "Type 0" routing extension header as predicted to be seen by the destination computer system.

Typically, when the security association is created, it is also possible to predict the "Type 0" routing extension header as seen by the destination computer. Thus, the predicted extension header can be stored in the template memory when the security association is created, and is invariant for the lifetime of the security association.

Figure 15A:
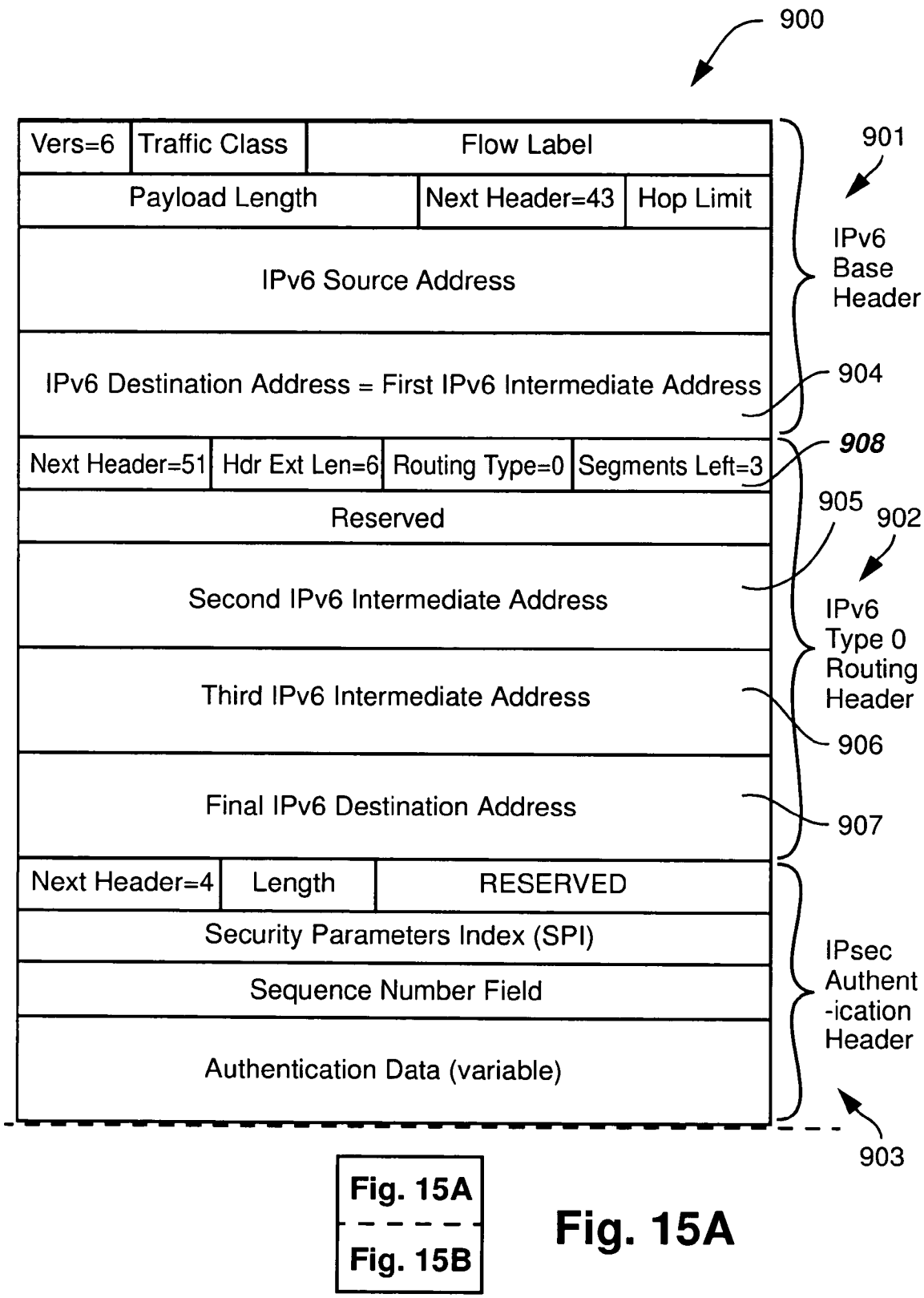
FIGS. 15A and 15B depict the IPv4 packet of FIG. 14 encapsulated in an exemplary IPv6 tunnel packet including routing options and authentication header.
Figure 16A:
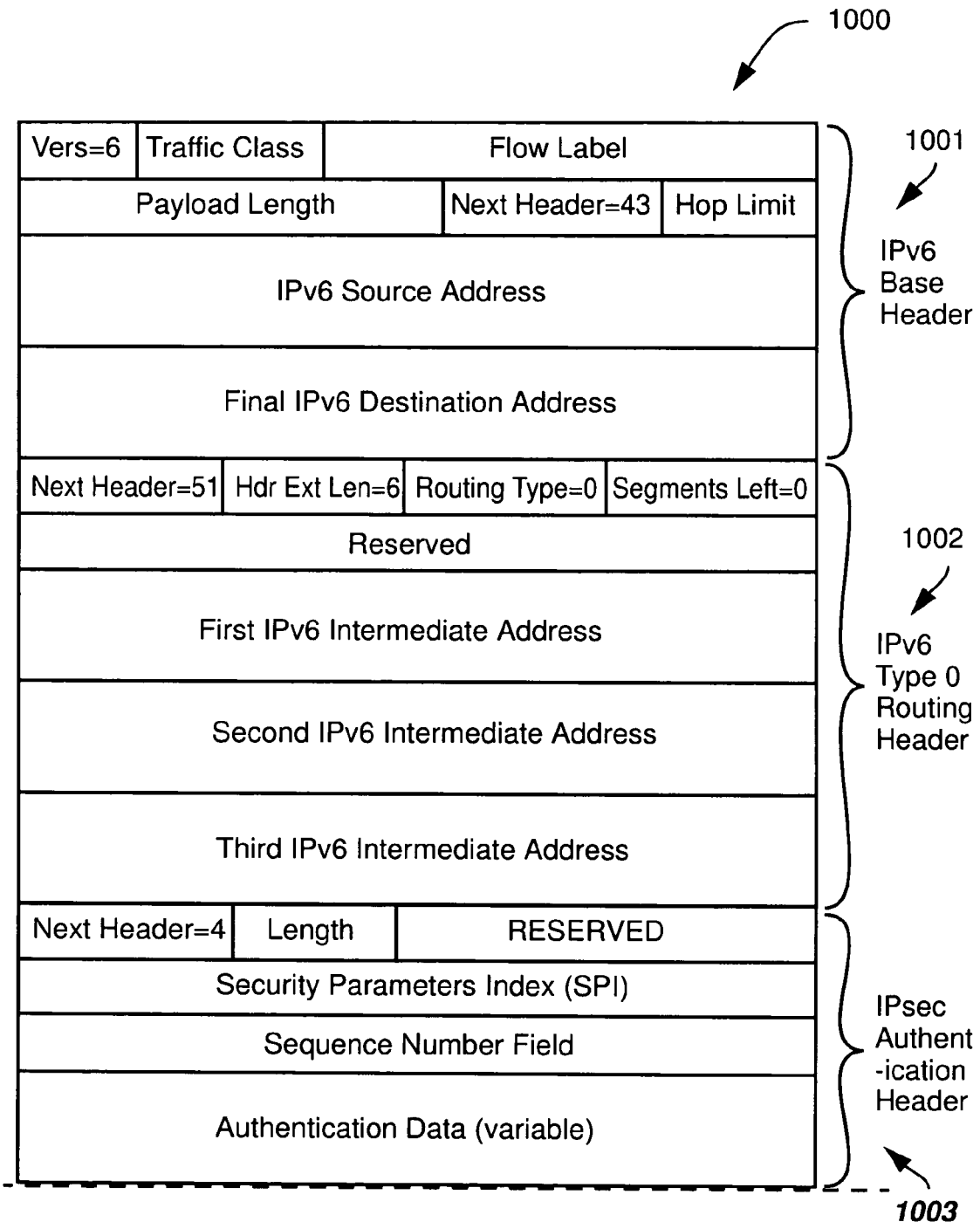
FIGS. 16A and 16B show the tunnel packet of FIGS. 15A and 15B upon arrival at the destination computer of FIG. 1.

In the case of a "Type 0" routing extension header, the predicted header may have the form (1002) as shown in FIG. 16A. This differs from the non-predicted (source) header, which may have the form (902) as shown in FIG. 15A. In the case of a "Type 0" routing extension header, the differences are the IP addresses included in the header, and the "segments left" field.

Both the extension header, and the predicted extension header will be retrieved from the template memory when the security association is used to process a packet.

Continuing to follow this example, the predicted extension header would be used in the calculation of the authentication data, while the non-predicted (source) extension header would be used in the construction of the IPv6 packet.

The extension header template would remain in the template memory while it is being used by one or more security associations. Typically, a security association is terminated after a specified period of time has elapsed, or after it has been used to process a specified number of bytes or packets. Typically, the lifetime of a security association is determined by the security policy that was used to create it.

If an extension header template is no longer being used by any security associations, it may be overwritten by a new extension header template. Typically, the management of the template memory would be handled by the software in the source computer system that also used to establish security associations and create the extension header templates.

Figure 4A:
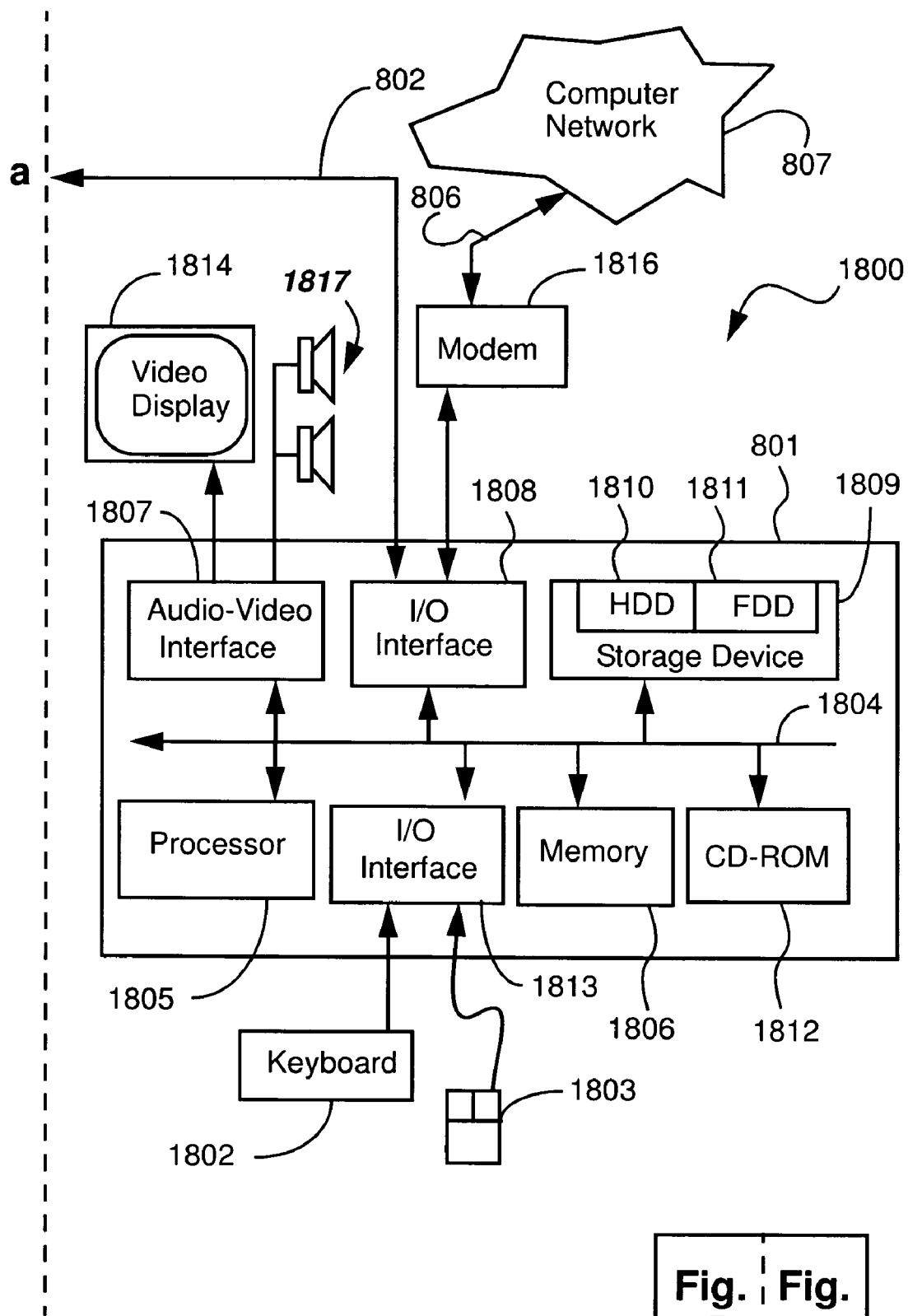
FIG. 4A shows the general purpose computer of FIG. 1 in more detail.

FIG. 4A shows the general purpose computer of FIG. 1 in more detail. The method of IP tunneling can be practiced using a combination of the general-purpose computer system 1800, such as that shown in FIG. 4A, together with the special purpose hardware module 803 shown in FIGS. 1-3 and 4B. The distribution of functionality between the computer 801 and the IP hardware module 803 can be varied, and is not limited by the arrangement described in this description. The processes of FIGS. 7-13 may be implemented as software, such as the tunneling application software program 210 executing within the computer system 1800. In particular, the steps of method of IP tunneling are effected by instructions in the tunneling software 210 that are carried out by the computer 801 and the module 803. The instructions may be formed as one or more code modules, each for performing one or more particular tasks. The tunneling software 210 may also be divided into two separate parts, in which a first part performs the IP tunneling methods and a second part manages a user interface between the first part and the user. The software 210 may be stored in a computer readable medium, including the storage devices described below, for example. The software 210 is loaded into the computer 801 from the computer readable medium, and then executed by the computer 801 and the hardware module 803. A computer readable medium having such software or computer program recorded on it is a computer program product. The use of the computer program product in the computer preferably effects an advantageous apparatus for IP tunneling.

The computer system 1800 is formed by the computer module 801, input devices such as a keyboard 1802 and mouse 1803, output devices including a display device 1814 and loudspeakers 1817. A Modulator-Demodulator (Modem) transceiver device 1816 is used by the computer module 801 for communicating to and from the communications network 807, for example connectable via the telephone line 802 or other functional medium. The modem 1816 can be used to obtain access to the Internet, and other network systems, such as a Local Area Network (LAN) or a Wide Area Network (WAN), and may be incorporated into the computer module 801 in some implementations.

In the present example, the IP processing module 803 is connected to the computer 801 over a dedicated connection 802. Alternately, the module 803 could be connected to the computer 801 over the network 807 when the IP processing module is implemented in devices such as network routers or network switches.

The computer module 801 typically includes at least one processor unit 1805, and a memory unit 1806, for example formed from semiconductor random access memory (RAM) and read only memory (ROM). The module 801 also includes a number of input/output (I/O) interfaces including an audio-video interface 1807 that couples to the video display 1814 and the loudspeakers 1817, an I/O interface 1813 for the keyboard 1802 and the mouse 1803 and optionally a joystick (not illustrated), and an interface 1808 for the modem 1816 and for communicating with the IP processing module 803. In some implementations, the modem 1816 may be incorporated within the computer module 801, for example within the interface 1808. A storage device 1809 is provided and typically includes a hard disk drive 1810 and a floppy disk drive 1811 for receiving a floppy disk 1836. A magnetic tape drive (not illustrated) may also be used. A CD-ROM drive 1812 for receiving a CD-ROM 1835 is typically provided as a non-volatile source of data. The components 1805 to 1813 of the computer module 801, typically communicate via an interconnected bus 1804 and in a manner which results in a conventional mode of operation of the computer system 1800 known to those in the relevant art. Examples of computers on which the described arrangements can be practised include IBM-PC's and compatibles, Sun Sparcstations or alike computer systems evolved therefrom.

Typically, the tunneling application program 210 is resident on the hard disk drive 1810 and read and controlled in its execution by the processor 1805 (in the computer 801) and the processor 1831 (in the IP processing module 803). Intermediate storage of the program 210 and any data fetched from the network 807 may be accomplished using the semiconductor memories 1806 and 1832, possibly in concert with the hard disk drive 1810. In some instances, the tunneling application program 210 may be supplied to the user encoded on the CD-ROM 1835 or the floppy disk 1836 and read via the corresponding drive 1812 or 1811, or alternatively may be read by the user from the network 807 via the modem device 1816. Still further, the software can also be loaded into the computer system 1800 from other computer readable media.

The term "computer readable medium" as used herein refers to any storage or transmission medium that participates in providing instructions and/or data to the computer system 1800 and the IP module 803 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 801 and the IP module 803. Examples of transmission media include radio or infra-red transmission channels as well as a network connection to another computer or networked device, and the Internet or Intranets including e-mail transmissions and information recorded on Websites and the like.

Figure 4B:
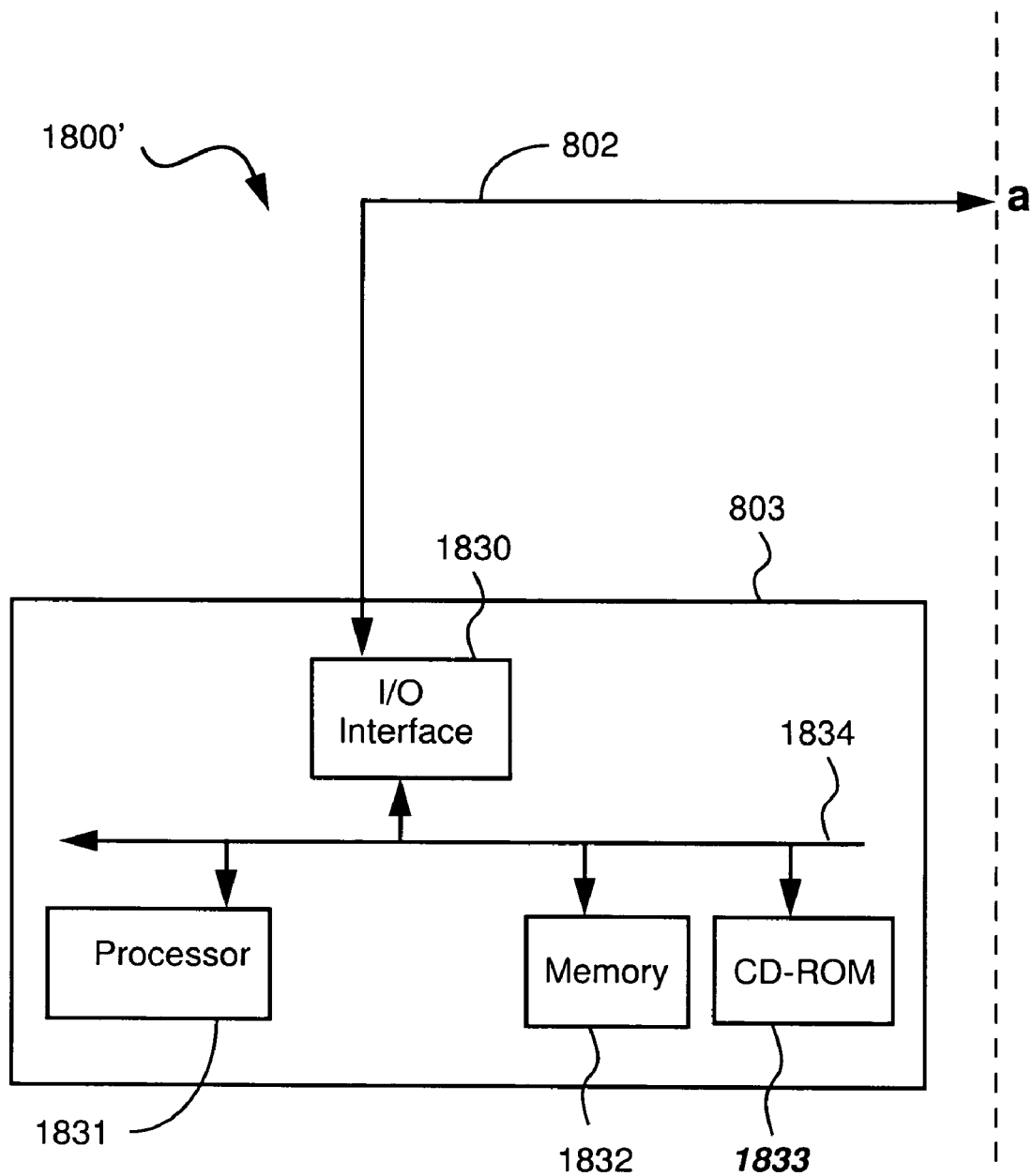
FIG. 4B shows the IP hardware module of FIG. 1 in more detail.

FIG. 4B shows the IP hardware module 803 of FIG. 1 in more detail. The IP hardware module 803 comprises the processor 1831, the memory 1832, and, if it is desired to load the tunneling application software via the IP module 803, a CD-ROM drive 1833 for receiving a CD-ROM (not shown) containing the tunneling application software. An I/O interface 1830 provides interaction, as depicted by the arrow 802, with the source computer 801 as shown in FIG. 1.

In the event that the IP hardware module 803 is, or forms part of an embedded computer system, then the tunneling application software can be embedded in ROM within the memory 1832, and the CD-ROM drive 1833 would not be present.

Figure 5:
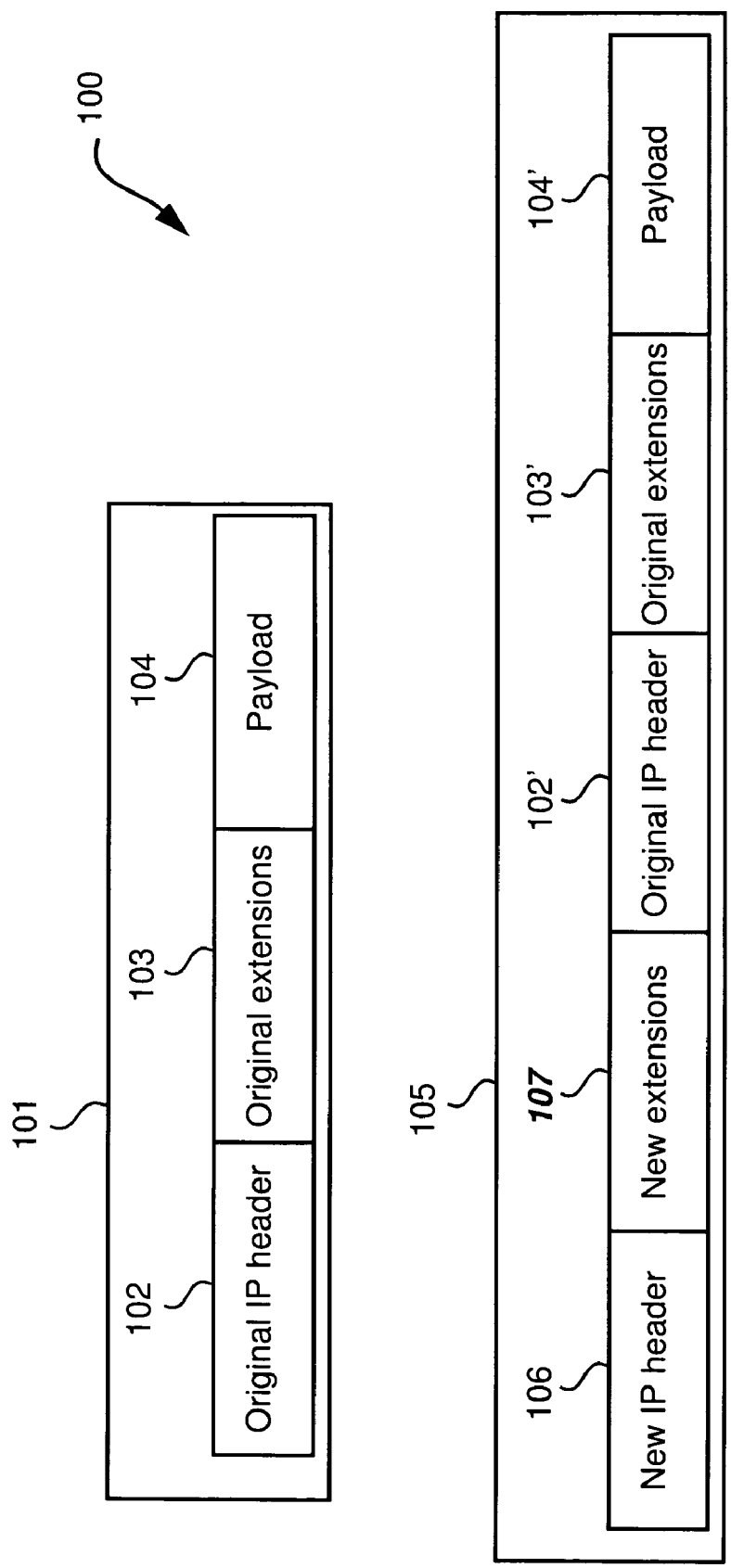
FIG. 5 depicts an IP packet and the tunnel packet that results from encapsulating the IP packet.

FIG. 5 depicts, at 100, an IP packet 101 and the tunnel packet 105 that results from encapsulating the IP packet 101. The IP packet 101 consists of an IP header 102, IP extension headers 103, and a payload 104. After tunneling, the new (tunnel) IP packet 105 is constructed. The tunnel packet 105 has a new IP header 106, new IP extension headers 107, followed by a payload 102'30 103'30 104'0 which is a copy of the original IP packet 101. The IP header 102'0 is a copy of the IP header 102. The IP extension headers 103'0 are copies of the IP extension headers 103. The payload 104'0 is a copy of the payload 104.

In the tunnel packet 105, the new IP header 106 is referred to as an outer IP header. The IP extension headers 107 are referred to as outer IP extension headers. In contrast, the copy 102' of the original IP header 102 is referred to as an inner IP header. Furthermore, the copies 103' of the original IP extension headers 103 are referred to as inner IP extension headers.

As previously noted, the outer IP header 106 can typically be constructed by copying some fields from the inner IP header 102'. However, construction of the outer IP extension headers 107 is more complex, since the outer IP extension headers 107 are not necessarily related to the original IP packet 101.

Figure 6:
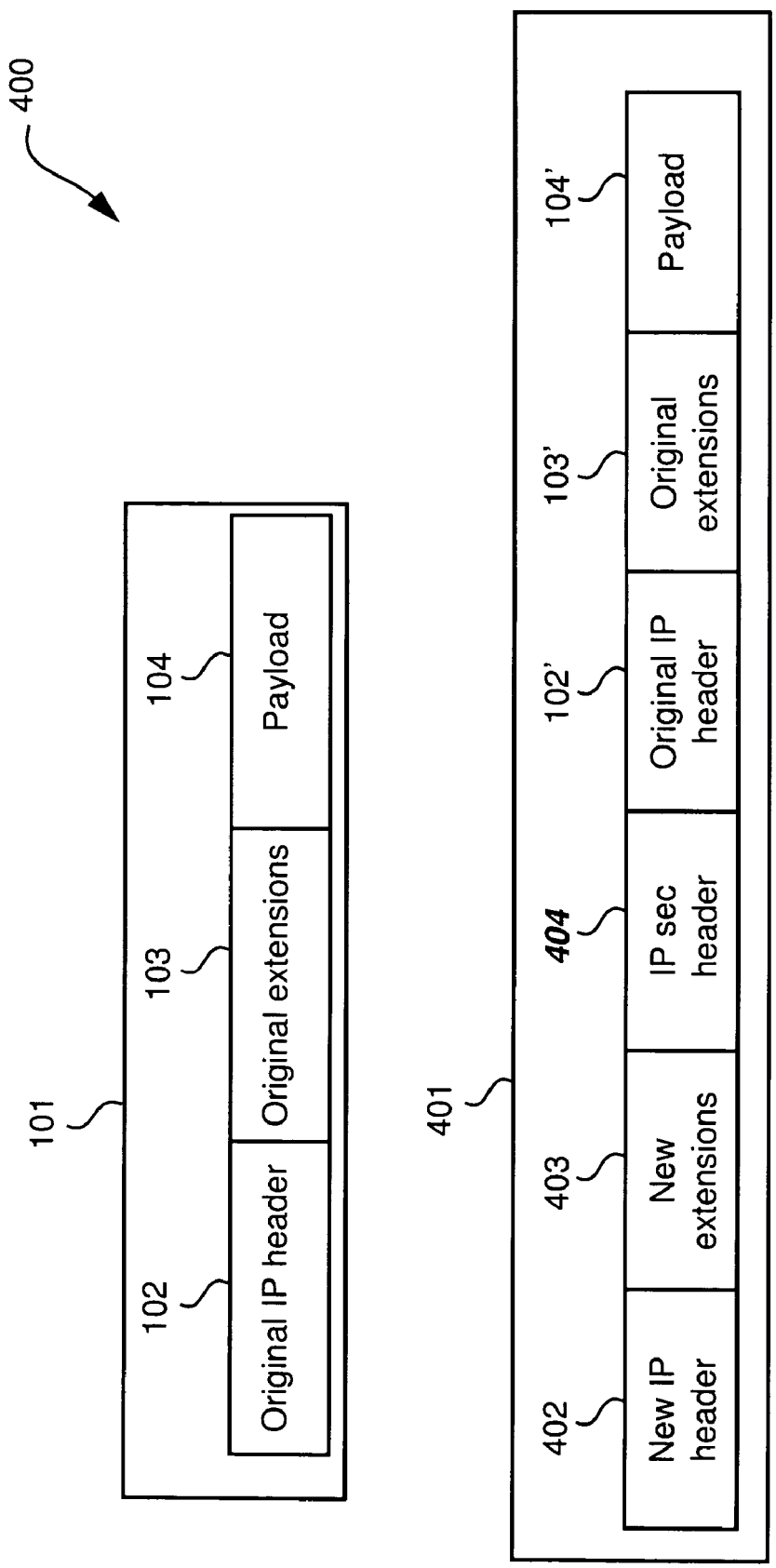
FIG. 6 shows another instance of packet encapsulation including an IPsec header.

FIG. 6 shows another instance 400 of packet encapsulation, where the tunnel packet includes an IPsec header. The original IP packet 101 contains the IP header 102, and the payload 104. It also contains, in the present example, the IP extension headers 103. As a result of encapsulation, a new IP tunnel packet 401 is formed. This packet 401 contains a new outer IP header 402, and a copy 102' of the original IP header 102, as well as a copy 103' of the original IP extension headers 103. The new packet 401 also contains a copy 104' of the original payload 104. The new packet 401 also contains an IPsec header 404, such as an authentication header, that is added as part of IPsec processing. The new packet 401 also contains new (outer) IP extension headers 403 that are created from the IP extension header templates stored in the extension header memory region 304 (see FIG. 3) according to the disclosed IP tunneling approach. When the IPsec processing includes the addition of an authentication header and tunnel mode, the IPsec header 404 in FIG. 4 is an authentication header that applies to the whole IP packet 401, including the new IP extension headers 403. This will be explained in more detail in regard to FIGS. 9 and 10.

Figure 7:
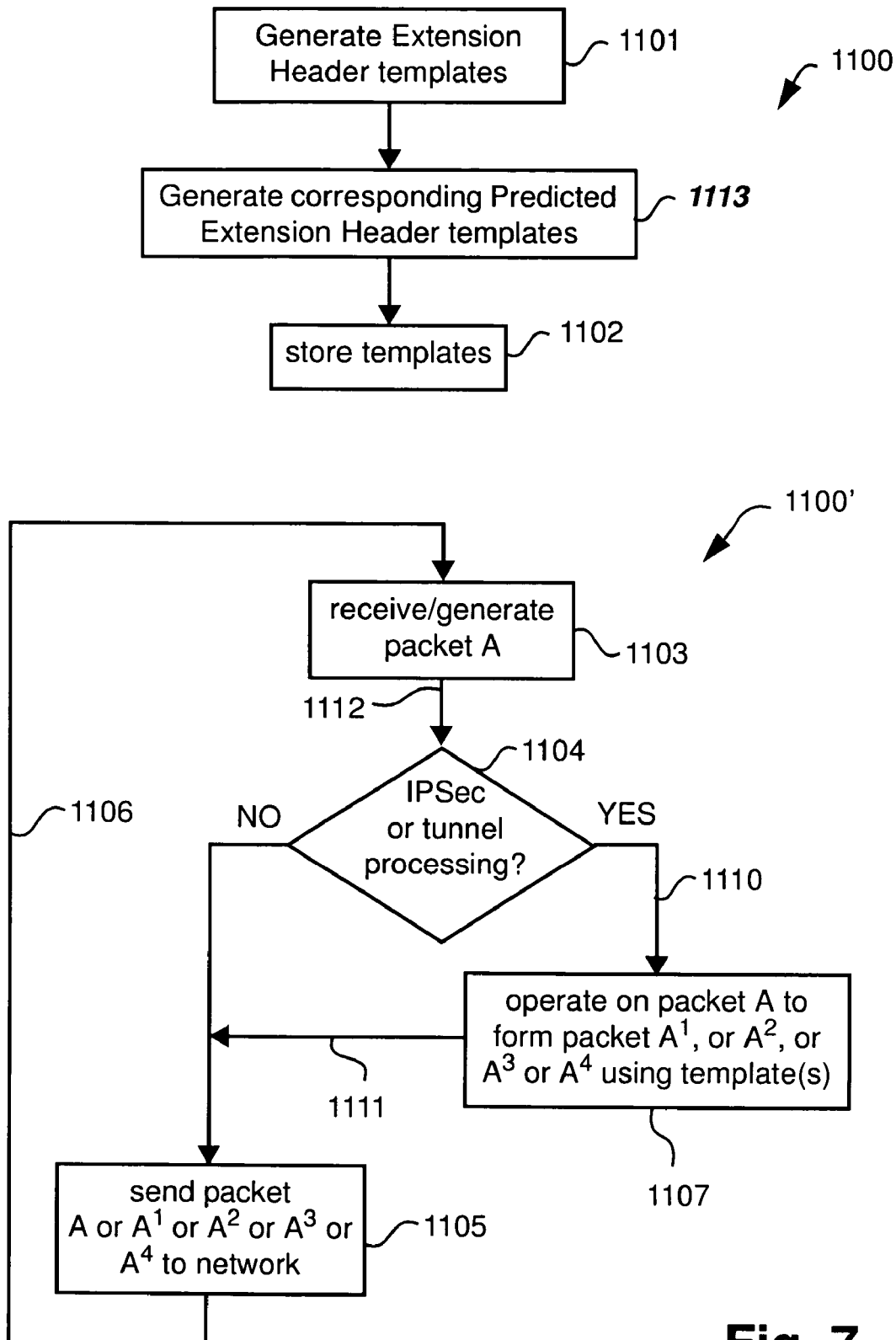
FIG. 7 shows processes for generating pre-defined templates, and for using these templates to process IP packets.

FIG. 7 shows processes for generating pre-defined templates, and for using these templates to process IP packets according to the disclosed tunneling technique. Each of two illustrated processes 1100 and 1100' can be implemented as separate but inter-related process modules running on the computer 801 and the IP module 803. The process 1100 relates to generation of (i) the Extension Header templates for storage in the memory region 304 and (ii) the Predicted Extension Header templates for storage in the memory region 305 (see FIG. 2) of the extension header template memory 205. The process 1100' processes packets according to the disclosed tunneling technique using the pre-defined templates generated by the process 1100.

In a first step 1101 of the process 1100, either or both of the application software 202 and the tunneling application software 210 generate Extension Header templates for storage in the memory region 304. A following step 1113 generates the corresponding Predicted Extension Header templates for storage in the memory region 305. In general, a single corresponding Predicted Extension Header template is generated in the step 1113 for each Extension Header template that is generated in the step 1101. It is possible, however, to generate more than one corresponding Predicted Extension Header template for each Extension Header template. A following step 1102, performed by the driver software 201, stores these templates in the memory regions 304 and 305 of the extension header template memory 205. The process 1100 depicts an a-priori process for generation and storage of templates in the memory regions 304 and 305. This is, however, only one example of how the extension header templates or any other templates usable by the disclosed technique can be generated. p Thus, to consider an example of the process 1100, an Extension Header template referred to as $304^1$ incorporates a specific Type 0 routing option as described in relation to FIGS. 15A-15B. A corresponding Predicted Extension Header template referred to as $305^1$ incorporates predicted header fields derived from the header fields of the first Extension Header template $304^1$. The aforementioned prediction operation is based upon authentication header requirements. The Predicted Extension Header template $305^1$ thus enables an authentication header (eg. 903 in FIG. 15A), that is suitable for use with the Extension Header template $304^1$, to be determined at a later stage in the event that such an authentication header is required.

Turning to the process 1100' in FIG. 7, a first step 1103, performed by the application software 202 and the driver software 201, receives and/or generates a packet A. Thus, for example, the application software 202 can generate the packet A, or alternately, the packet A can be received from another software process (not shown) and provided to the driver software 201. Thereafter, a decision step 1104, performed by the processor 303, determines whether IPsec or tunneling processing is required. This would be established by the security policy in the security policy database. If this is the case, then control passes according to a YES arrow to a step 1107.

The step 1107, implemented by the IP hardware module 803 operates on the packet A to form a packet referred to respectively as $A^1$ (if only non-authentication IPsec processing is performed), $A^2$ (if only tunneling is required), $A^3$ (if tunneling and IPsec authentication processing is performed) or $A^4$ (if only IPsec authentication processing is performed) using templates in the extension header template memory 205. The packets A and $A^3$ are, respectively, illustrated by packets 700 in FIGS. 14 and 900/900' in FIGS. 15A, 15B. The transformation of the packet from the form A to the forms $A^1$ or $A^2$ or $A^3$ or $A^4$ will be described in more detail with reference to FIG. 9.

Returning to FIG. 7, after the step 1107, a step 1105, performed by the IP hardware module 803, sends the packet $A^1$ or $A^2$ or $A^3$ or $A^4$ to the network 807 by means of which the packet is transmitted to the destination computer 809. After the step 1105, control passes in accordance with an arrow 1106 back to the step 1103. Returning to the testing step 1104, if neither IPsec nor tunnel processing are needed, then control passes according to a NO arrow to the step 1105.

In summary, FIG. 7 depicts both generation of the predefined packet fields (ie templates stored in the memory regions 304, 305) in accordance with the process 1100, and the use of these templates, stored in the memory regions 304, 305, in IP packet processing according to the process 1100'.

Figure 8:
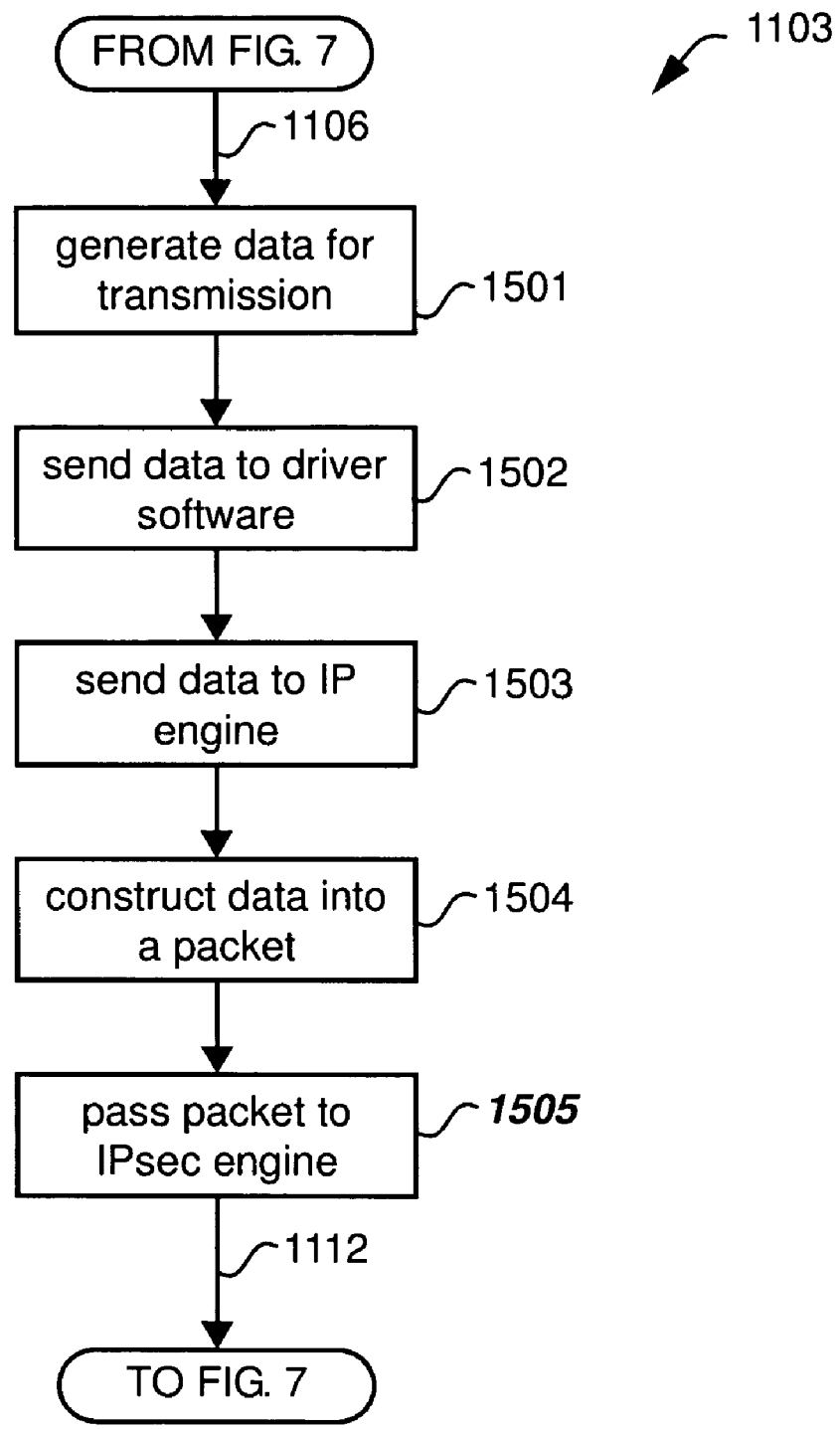
FIG. 8 shows how packets in FIG. 7 are generated.

FIG. 8 shows the process 1103 (see FIG. 7) by means of which packets such as A in FIG. 7 are generated. Control passes, in accordance with the arrow 1106, from FIG. 7 to a first step 1501. The process 1103 commences with the step 1501 which generates data for transmission. The step 1501 is typically performed by the application software 202. Thereafter, a step 1502, again performed by the application software 202, sends the aforementioned data to the driver software 201. A following step 1503, that is performed by the driver software 201, sends the aforementioned data to the IP engine 203 in the hardware module 803. Thereafter, a step 1504, performed by the IP engine 203, constructs the aforementioned data into the packet A. A subsequent step 1505 passes the aforementioned packet A to the IPsec engine 204. After the step 1505 control passes in accordance with the arrow 1112 back to the testing step 1104 in FIG. 7.

Figure 9:
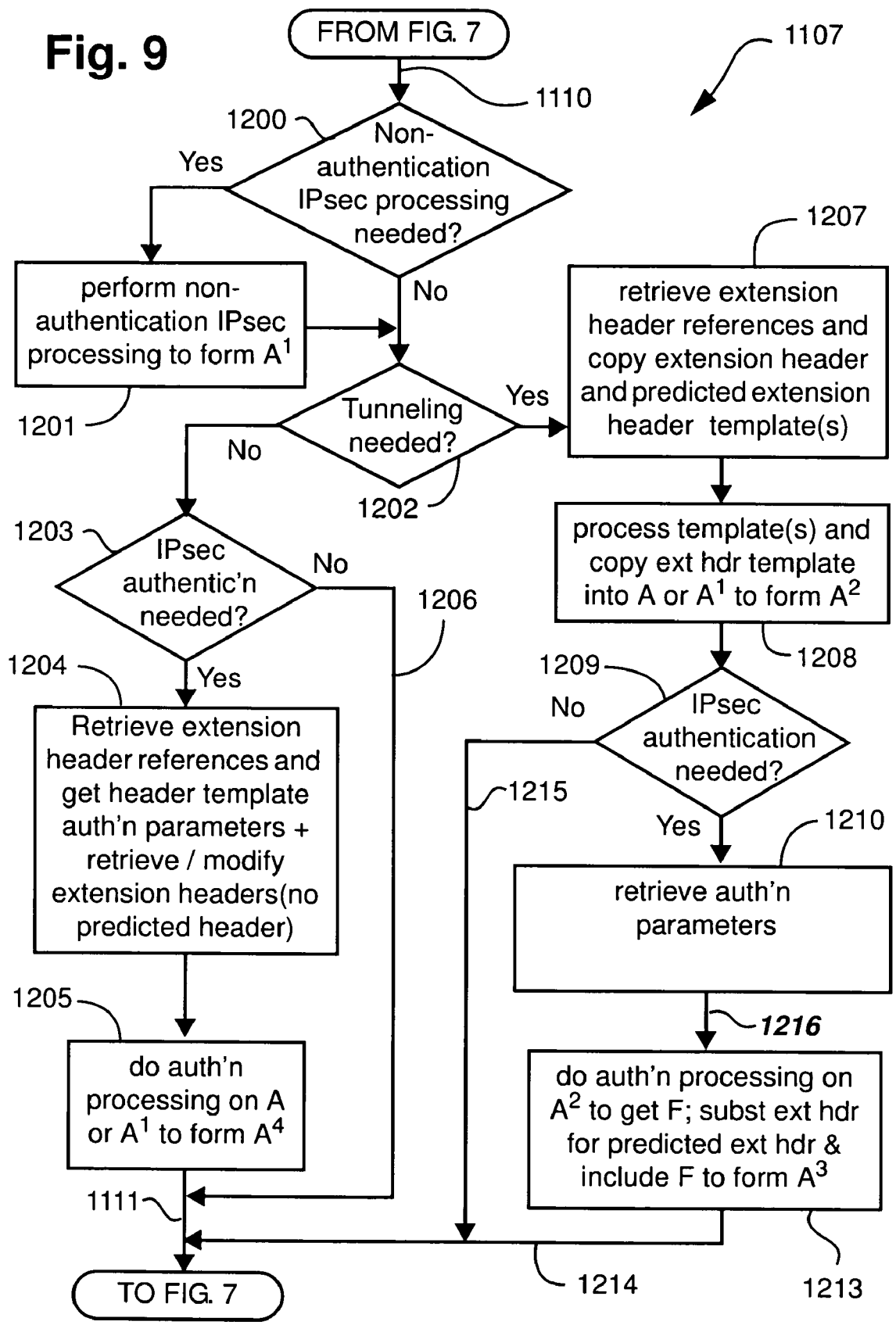
FIG. 9 shows how packets in FIG. 7 are processed according to the disclosed tunneling technique.

FIG. 9 shows the process 1107 by means of which packets A in FIG. 7 are processed according to the disclosed tunneling technique.

In IPsec processing, typically, IP datagrams are first checked against the Security Policy database 300. Fields from the IP packet, such as source IP address, destination IP address, transport protocol (eg: Transmission Control Protocol (TCP), or User Datagram Protocol (UDP)), transport source address, and transport destination address are compared against selectors in Security Policies in the database 300. Typically, each Security Policy is checked in turn, until a matching policy is found. The Security Policy database 300 is typically set up by systems or network administrators, in order to enforce security policies on an individual, site, institution, or company basis. If the matching policy indicates that IPsec processing is required before the IP datagram can be transmitted, the Security Association database 301 is searched. The matching policy typically contains an index into the Security Association database 301, indicating the first Security Association to check. Typically, subsequent Security Associations are linked from the first Security Association, in a linked list fashion. Each Security Association also has selectors, which are typically the same selectors used in the Security Policy database 300. The selectors allow a finer-grain selection of a particular Security Association for an IP datagram.

If no matching association can be found, then a new Security Association must be negotiated between the source and destination computer systems 801 and 809 respectively. Typically this negotiation is done using key-exchange protocols such as Internet Key Exchange (IKE). Key generation and exchange is typically a complex procedure, and would most likely be handled by the software driver 201, possibly with some form of hardware acceleration (not shown) for computationally expensive operations. Parameters that determine what type of Security Association must be negotiated (eg: cryptographic algorithm, key length, byte and/or time expiry limits) typically come from fields in the Security Policy.

Security Associations are typically dynamic in nature, since they do not generally survive equipment being turned off, and may also expire due to byte count restrictions, and/or time expiry. If a Security Association expires, a new association must be negotiated as a replacement. This would typically involve the generation of a new cryptographic key. In contrast, Security Policies tend to be more static, since they usually reflect a site, company, or institutional policy with regard to security.

In addition to the selectors, Security Associations specify the details of the particular cryptographic operation to be performed. Typical parameters used to specify the operation include AH/ESP, algorithm, key, initial value, sequence number, transport/tunnel mode, byte count, and time expiry.

The relationship between a Security Association and a header template, or header templates, is clearly advantageous. When the Security Association is found, and it specifies that an Authentication Header is required, in tunnel mode, then the IPsec engine 204 may need to add an extension header (or headers) to the datagram before the cryptographic operation 1201 is performed.

In addition to the cryptographic parameters, the Security Association may store an index, or indices, to header template (s) in the header template memory 205. Alternatively, the separate header index database 302 may be used to store indices into the header template memory. In this latter case, the Security Association may contain a single index into the header index database 302, and the header index database 302 then contains the index, or indices, into the header template memory 205.

The values of these indices to header templates would typically be initialized by the software driver 201, as part of the creation process of a new Security Association. The details of what headers are required, and the contents of those headers, would typically be defined as part of the site, company, or institution-wide policy on security.

The process 1107 in FIG. 9 commences with control passing from FIG. 7, in accordance with the arrow 1110 to thereby direct the process 1107 to the packet "A". A testing step 1200 determines if IPsec processing that does not involve authentication is required for the packet A. This would be established by the security association in the security association database. If this is the case, then control passes in accordance with a YES arrow to a step 1201. The step 1201, performed by the IPsec engine 204, retrieves cryptographic parameters needed for the non-authentication IPsec processing and performs this processing to form from the packet A the packet $A^1$. Thereafter, control passes to a testing step 1202.

The step 1202, performed by the processor 303 (see FIG. 3), based on information stored in the Security Association, determines if tunneling is needed for the current packet being considered. This would be established by the security association in the security association database. If this is the case, then control passes in accordance with a YES arrow to a step 1207. The step 1207, performed by the processor 303, retrieves an extension header index from the template index database 302. The step 1207 then uses this index to obtain copies of corresponding Extension Header and predicted extension header templates from the extension header template memory 304 and the predicted extension header template memory 305 respectively. Thereafter, a step 1208 inserts the copy of the retrieved extension header template into the packet A or $A^1$ in order to thereby form a modified intermediate packet $A^2$. The step 1208 can also perform modifications to the predicted header template copy including replacement of a blank Sequence Number Field in an Authentication Header template with the current sequence number (one of the cryptographic parameters associated with the Security Association), and replacement of a blank Next Header field in a Type 0 Routing Header with the IP protocol number of the following header or transport protocol.

After the step 1208, control passes to a testing step 1209 which determines whether IPsec authentication is needed. This would be established by the security association in the security association database. If this is the case then control is passed according to a YES arrow to a step 1210. The step 1210 retrieves authentication parameters from the security association database 301. Thereafter a step 1213 performs authentication processing to determine the authentication field F (the Integrity Check Value (ICV)) and to thereby form the packet $A^3$. At least part of the authentication processing performed by the step 1213 is performed in relation to the predicted header template that was processed by the step 1208 as is described in more detail in regard to FIG. 11. Subsequently, control passes in accordance with an arrow 1214 back to FIG. 7 in accordance with the arrow segment 1111. Returning to the step 1209, if authentication is not required, then control passes according to the NO arrow back to FIG. 7 in accordance with the arrow segment 1111.

Although the process 1107 that has been described in relation to FIG. 9 uses the two steps 1207 and 1210 to respectively retrieve the extension header indices and the authentication parameters, these operations can, in an alternate arrangement, be more efficiently retrieved at the same time when performing the step 1207.

Returning to the step 1202, if tunneling is not required, then control passes in accordance with a NO arrow to a step 1203 which determines whether IPsec authentication is needed. This would be established by the security association in the security association database. If this is the case then control is passed according to a YES arrow to a step 1204. The step 1204, performed by the processor 303, retrieves the extension header index from the template index database 302 and uses this index to obtain an Extension Header template stored in the extension header template memory 304. The step 1204 also retrieves authentication parameters from the security association database 301. The step 1204 also possibly modifies the extension header but does not retrieve or process a predicted header in this instance.

Examples of the modifications that can be performed to the extension header include replacement of a blank Authentication Data field in an Authentication Header with the Integrity Check Value of the authenticated datagram calculated by hardware included in the IPsec engine 204, replacement of a blank Sequence Number Field in an Authentication Header template with the current sequence number (one of the cryptographic parameters associated with the Security Association), and replacement of a blank Next Header field in a Type 0 Routing Header with the IP protocol number of the following header or transport protocol.

Thereafter a step 1205 inserts the (modified) extension header into the packet A or $A^1$ to form an intermediate packet, upon which the step 1205 then performs authentication processing to thereby form the packet $A^4$. Subsequently, control passes back to FIG. 7 in accordance with the arrow segment 1111. Returning to the step 1203, if authentication is not required, then control passes according to the NO arrow back to FIG. 7 in accordance with the arrow segment 1111.

Figure 10:
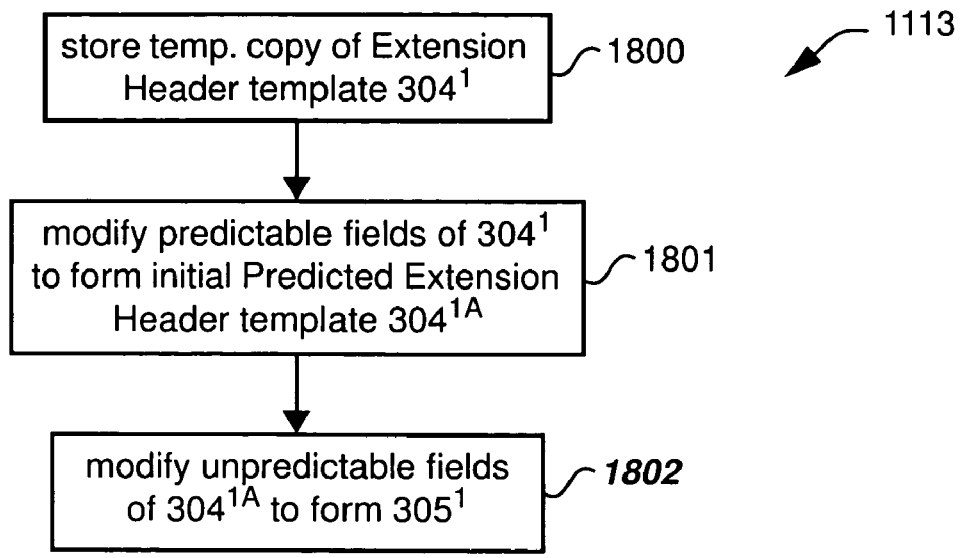
FIG. 10 shows a generic process for generating Predicted Extension Header templates in FIG. 7.

FIG. 10 shows the process 1113 in FIG. 7 for generating the Predicted Extension Header templates to be stored in the predicted extension header memory 305 in FIG. 3. A first step 1800 stores a copy of the Extension Header template $304^1$ in a temporary memory (not shown). Thereafter, a step 1801 modifies predictable fields of the Extension Header Template $304^1$ to thereby form an initial Predicted Extension Header template $304^{1.4}$. A subsequent step 1802 modifies unpredictable fields of the initial template $304^{1.4}$ to form the Predicted Extension Header template $305^1$ as referred to in relation to FIG. 7. The Extension Header template $304^1$ and the associated Predicted Extension Header template $305^1$ are respectively stored in the extension header memory 304 and the predicted extension header memory 305 in FIG. 3.

In performing the authentication algorithm on IPv4 packets, the following IPv4 options are considered to be "predictable fields" for the purposes of the process 1801 in FIG. 10, and are thus included in processing headers or parts of headers for the purposes of the authentication algorithm:

end of options
no operation
router alert
send a directed multi-destination delivery p The aforementioned predictable fields are used without modification, or in other words, for these options, the header Template and Predicted Header Template would be the same.

The following IPv4 options are considered to be "unpredictable fields" for the step 1802 of FIG. 10 and are replaced by zeros in the step 1802:

loose source route
time stamp
record route
strict source route
trace route

The following IPv6 extension header is replaced in the step 1801 by the predicted value at the destination:

Type 0 routing

Accordingly, in the described arrangement, every extension header template has a corresponding predicted extension header template, however these may differ or be identical, depending on the specifics.

It is further noted that IPv6 has two extension headers that consist of smaller entities called "options". It is noted that these "options" are not the options referred to earlier in regard to the IP extension headers and/or options in the IPv4 packet header. These "options-within-IPv6-extension-headers" contain a bit which indicates whether the option should be included in the authentication calculation, or replaced by zeros for that calculation. The two such IPv6 extension headers with these options are:

hop by hop options
destination options

Figure 11:
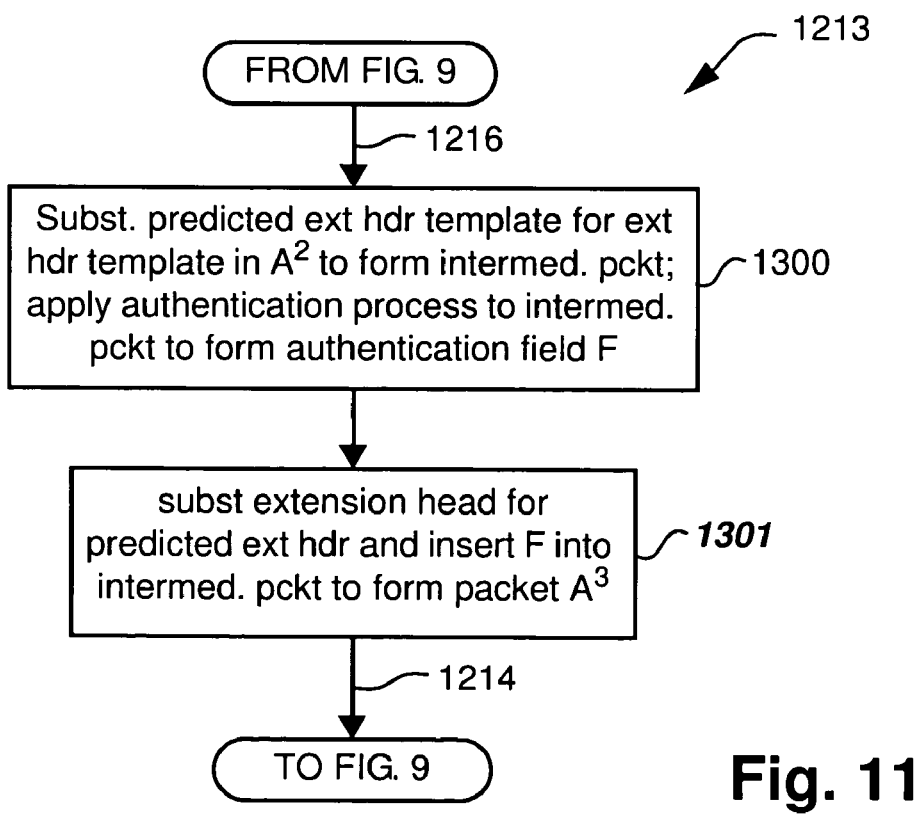
FIG. 11 shows the process of FIG. 9 for performing packet authentication.

FIG. 11 shows the process 1213 (see FIG. 9) for performing packet authentication. The process 1209 commences with control passing from FIG. 9 in accordance with the arrow 1216 to a step 1300. The step 1300 substitutes the (modified) predicted extension header template copy for the extension header template copy in the packet $A^2$ to form an intermediate packet. The step 1300 then applies an authentication procedure to the intermediate packet to determine an authentication field F. Thereafter, a step 1301 inserts the field F into the intermediate packet. The step 1301 also substitutes the extension header template in the intermediate packet for the predicted extension header template thus forming the packet $A^3$. Thereafter, control passes in accordance with the arrow 1214 back to FIG. 9.

Figure 12:
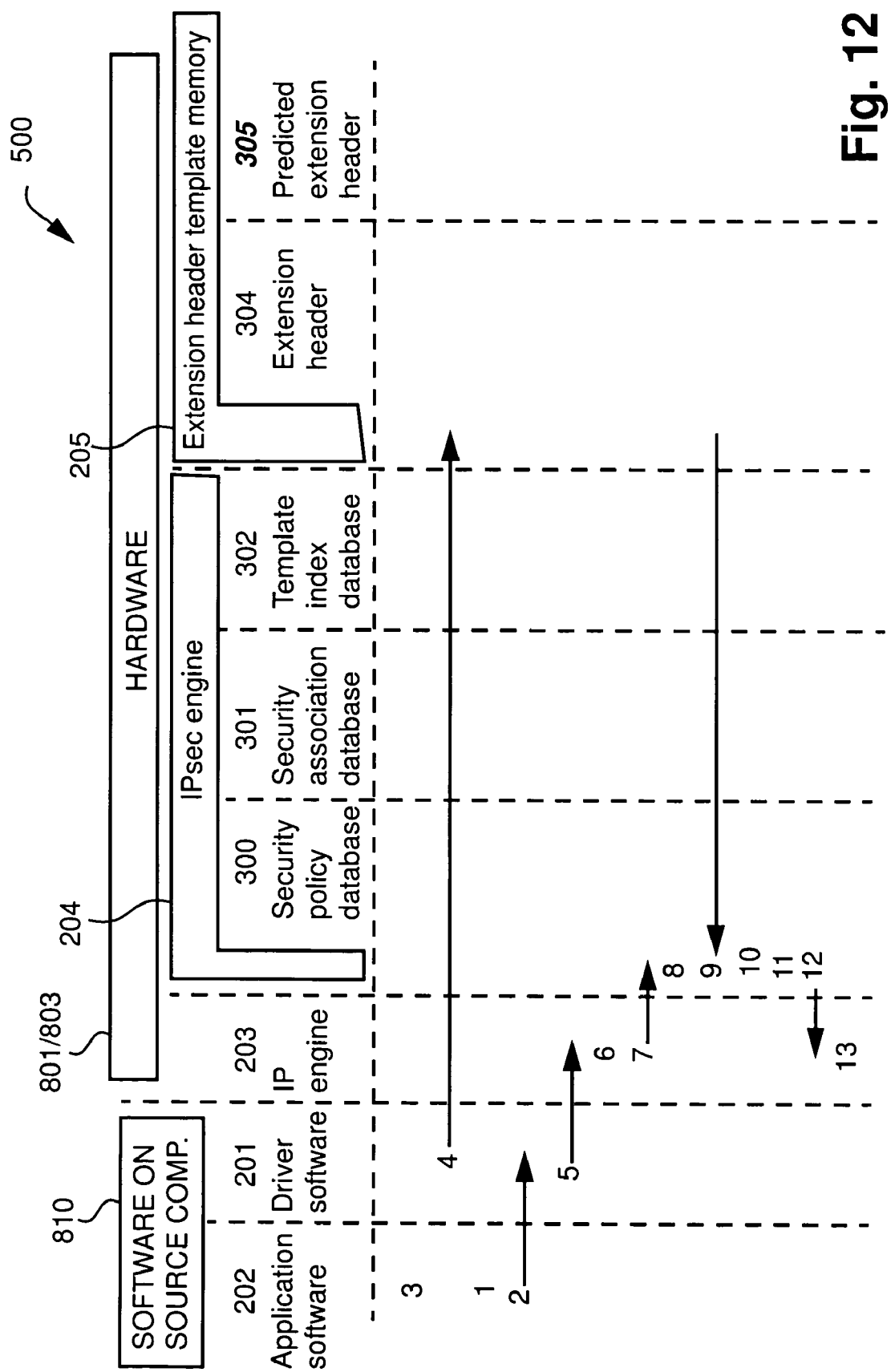
FIG. 12 depicts data flow between the hardware and software elements of FIG. 1.

FIG. 12 depicts data flow 500 between the hardware and software elements of FIG. 2. In a step "3", the driver software 201 generates extension header templates and predicted extension header templates according to 1100 in FIG. 7, possibly using information from the application software 202 and the tunneling application software 210. In a following step "4" the driver software 201 stores the extension header templates in the memory region 304, and predicted extension header templates in the memory region 305, in the extension header template memory 205. A subsequent step "1" depicts data being generated by the application software 202 for transmission. A following step "2" depicts how the application software 202 transfers the aforementioned data to the driver software 201 which is capable of communicating with the IP hardware module 803. Thereafter in a step "5", the driver software 201 sends the data generated by the application software 202 in the step "1" to the IP engine 203. In a following step "6" the IP engine 203 constructs the data into an IP packet according to 1103 in FIG. 8 in order to encapsulate the data for transmission over the network 807.

In a following step "7" the IP engine 203 passes the aforementioned packet to the processor 303 of the IPsec engine 204 for IPsec processing. Thereafter, in a step "8", the IPsec engine 204 determines what IPsec processing, if any, is required. This is determined by searching the Security Policy database 300 followed by searching the Security Association database 301. In a subsequent step "9" the IPsec engine retrieves an appropriate IP extension header template and predicted extension header template from the extension header template memory 205. Such templates are required if IP tunneling is required, and if IP extension headers are required after the IP outer header (this being the case for IPv6). Alternately, in the IPv4 environment, templates are required if options are required in the IP header.

Figure 13:
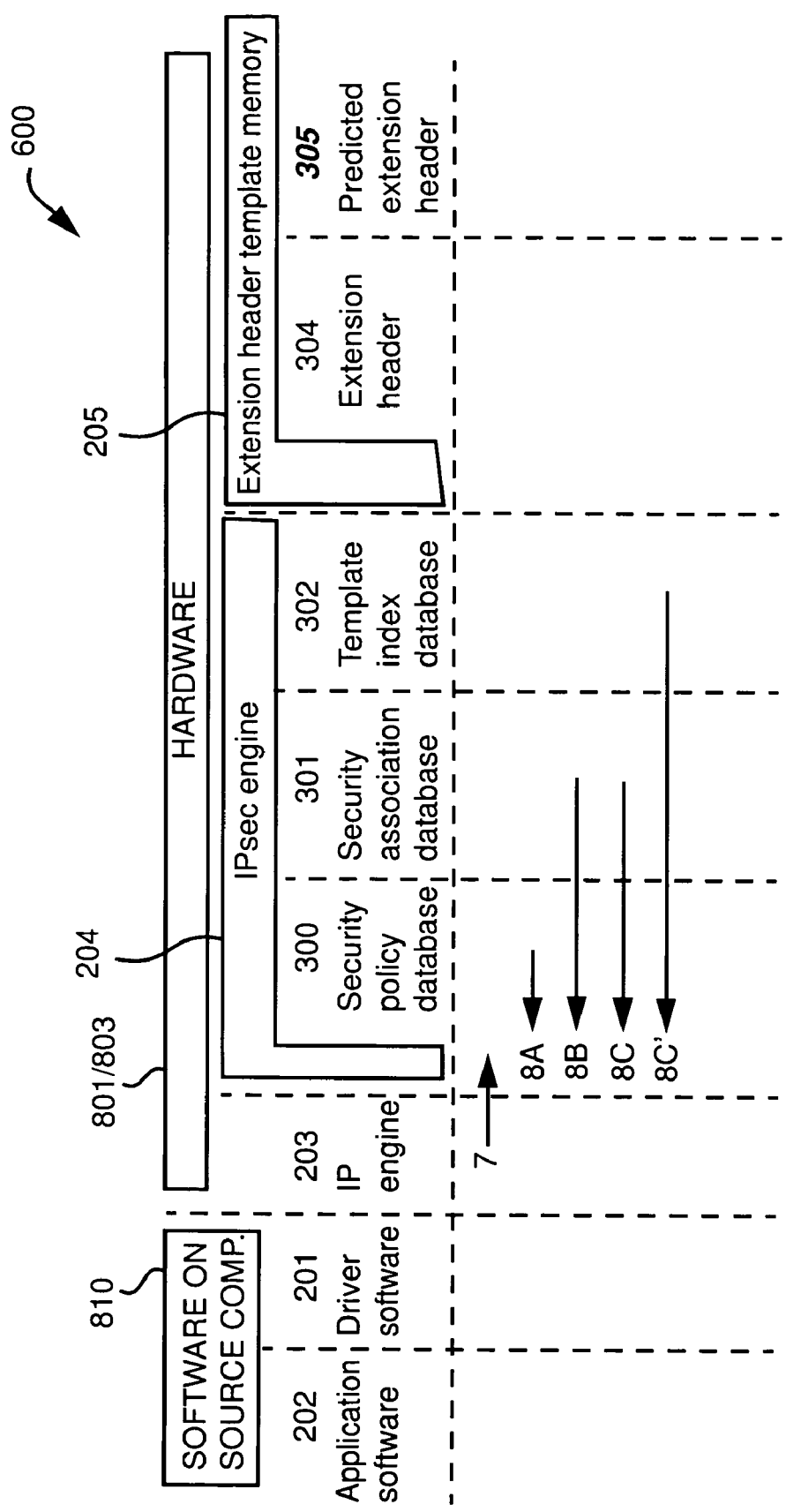
FIG. 13 shows the data flow for the security policy database element of FIG. 12 in more detail.

The step "9" is performed using references to the extension header template memory 205 that will be retrieved in a manner to be described in relation to FIG. 13. In a following step "10" the IPsec engine 204 inserts a copy of the IP extension header template into the IP packet, possibly modifying some parts of the IP extension header template before this insertion. Thereafter, in a step "11", the IPsec engine 204 further processes the packet, possibly by generating an authentication header using the corresponding predicted extension header template. In a subsequent step "12", the IPsec engine 204 returns the processed packet to the IP engine 203 for transmission. Finally, in a step "13" the IP engine 203 transmits the packet over the network 807.

FIG. 13 shows the data flow of FIG. 12 in more detail. The data flow process commences with the step "7" in which the IP engine 203 passes the packet to the processor 303 of the IPsec engine 204 for IPsec processing. Thereafter, in a step "8A" the IPsec engine 204 consults the security policy database 300 to determine what, if any, IPsec processing is required for the packet under consideration. Thereafter, in a step "8B" the IPsec engine 204 retrieves the cryptographic parameters, (eg., keys, algorithms, etc) required to perform the IPsec processing from the security association database 301. This presupposes that IPsec processing is required in accordance with the step "8A". Thereafter, in a step "8C", the IPsec engine 204 retrieves references, which specify address locations of IP extension header templates and corresponding predicted extension header templates in the memory 205, and the order in which the template copies are to appear in the final packet, from the security association database 301. This presupposes that tunnel mode processing is required in accordance with the step "8A". Alternately, in a step "8C'", the IPsec engine 204 retrieves the aforementioned references from the template index database 302.

Upon receipt of the packet (alternately referred to as a datagram), the destination computer 809 first determines whether the datagram contains IPsec headers. If no IPsec headers are present, a Security Policy database (not shown) is consulted in order to determine a dispensation for the datagram. The dispensation may be either to accept the datagram, or to discard it. If the datagram does contain IPsec headers, the appropriate IPsec processing steps are attempted. Each IPsec processing step requires a corresponding Security Association in a Security Association database (not shown) of the destination computer 809. If a corresponding Security Association is absent, the datagram is discarded. In the case of the corresponding Security Association being present for an Authentication Header, the cryptographic parameters for that authentication calculation are retrieved from the Security Association, and used to calculate an Integrity Check Value (ICV) for the datagram. Some fields in the datagram are excluded from the calculation, and the Authentication Data field in the Authentication Header (which contains the ICV) is one such field. If the calculated ICV matches the ICV in the datagram, and all other conditions for validity are met (eg: sequence number is valid, byte count is not exceeded, time expiry is not exceeded), the datagram is considered authenticated.

After all IPsec processing has been completed on the received datagram, the destination computer 809 consults the Security Policy database (not shown) in order to determine what IPsec processing was expected to be present in such a datagram. If the required IPsec processing was present, the packet is accepted. Otherwise it is discarded.

Figure 14:
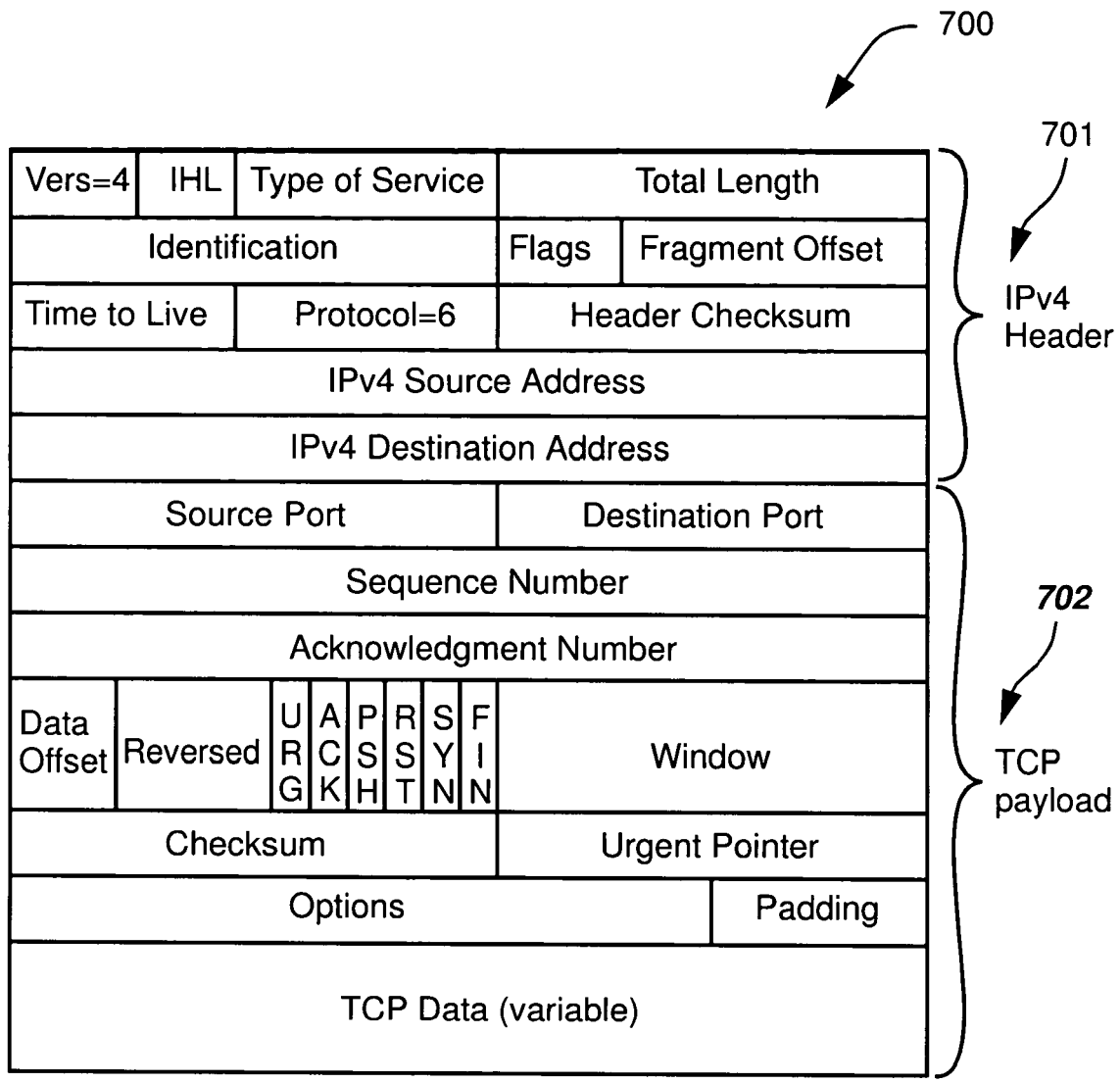
FIG. 14 shows an example of a IPv4 packet.

FIG. 14 shows the IPv4 packet 700. The IPv4 packet 700 consists of two parts, namely the IPv4 header 701, and the TCP payload 702. In order to send to send this packet 700 over an IPv6 network such as 807 in FIG. 1, the IPv4 packet 700 can be tunneled (ie., encapsulated). This requires that an IPv6 header be added, in which case the IPv4 packet 700 is treated as the payload of the new IPv6 packet. Furthermore, in the present example, it is desired to route the resultant IPv6 packet in a specified manner. In order to do this, a "Type 0" routing extension header is incorporated. Finally, for this particular example, it is desired to authenticate the IPv6 packet, and accordingly an "authentication header" is added before the payload.

Figure 15B:
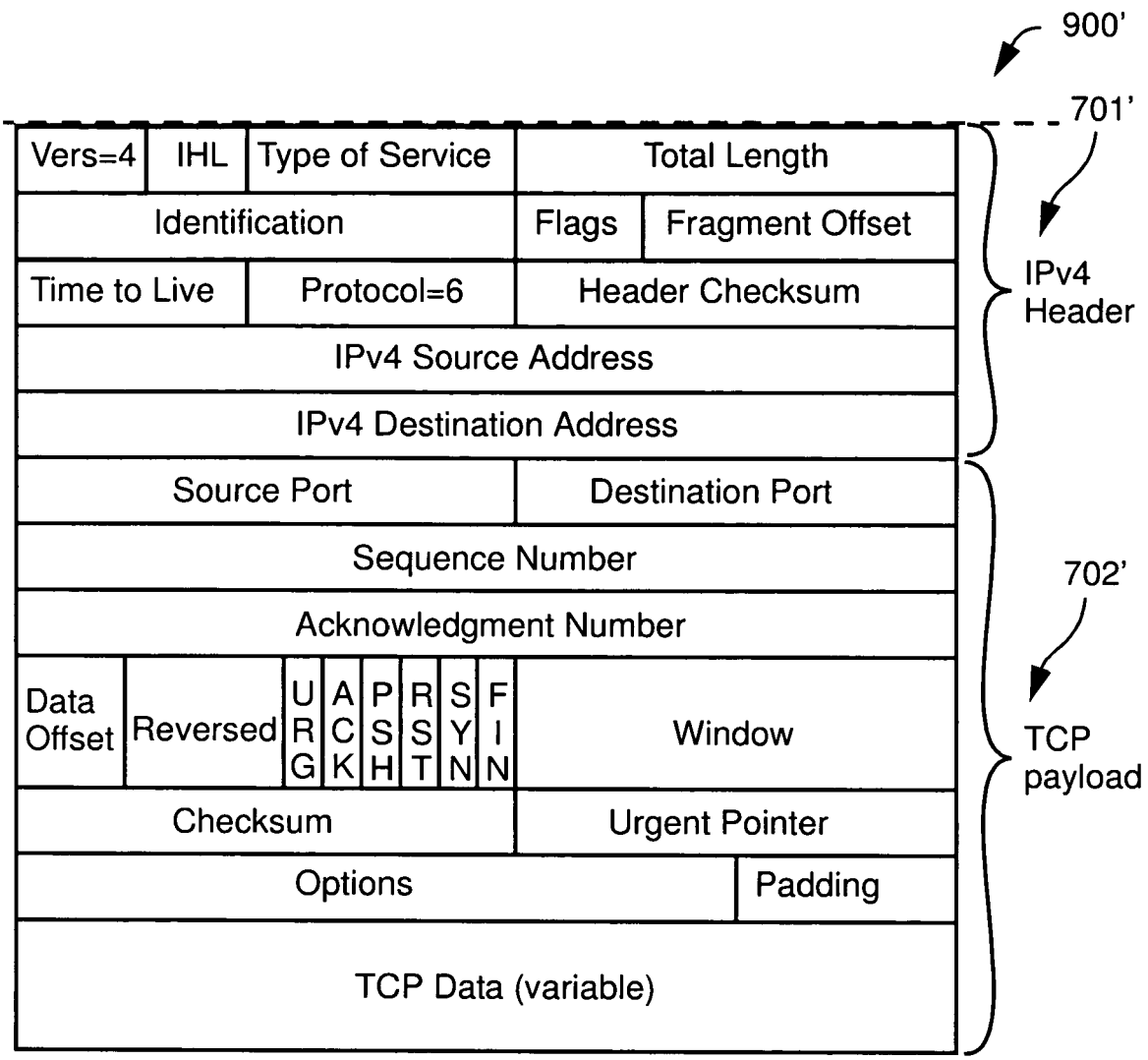

FIGS. 15A and 15B depict the IPv4 packet of FIG. 14 after encapsulation in an IPv6 tunnel packet including routing options and authentication. The IPv6 packet in FIGS. 15A and 15B is shown in two sections, these being referred to by reference numerals 900 (FIG. 15A) and 900' (FIG. 15B). The IPv6 packet section 900 has a base header 901, an IPv6 Type 0 routing header 902, and an IPsec authentication header 903. This particular example has three intermediate IPv6 addresses specified for the packet. Accordingly, FIG. 15A shows a first IPv6 intermediate address 904, a second IPv6 intermediate address 905, a third IPv6 intermediate address 906, and a final IPv6 destination address 907. In FIG. 15B the second segment 900' of the IPv6 packet comprises a copy of the original IPv4 packet 700 which has the IPv4 header 701' and the TCP payload 702'.

When the IPv6 packet (900 and 900') is transmitted across the network (such as 807), the packet is initially sent to a destination specified by the first intermediate address according to the field 904. When the packet reaches this destination, the second intermediate address 905 in the IPv6 Type 0 routing header 902 is interchanged with the first IPv6 intermediate address 904 which is in the destination address field of the IPv6 base header 901. Furthermore, the "segments left" field 908 is decremented.

Similarly, when the IPv6 packet arrives at the destination specified by the second intermediate address, according to the field 905, then the third intermediate address 906, which is in the IPv6 Type 0 routing header 902, is interchanged with the second intermediate address, which at this point is to be found in the destination address field of the IPv6 base header 901. Furthermore, the "segments left" field 908 is again decremented. Finally, when the IPv6 packet arrives at the destination specified by the third intermediate address, then the final destination address 907, which is in the IPv6 Type 0 routing header 902 is interchanged with the third intermediate address 906, which at this point is to be found in the destination address field 904 of the IPv6 base header 901. Furthermore, the "segments left" field 908 is again decremented.

Figure 16B:
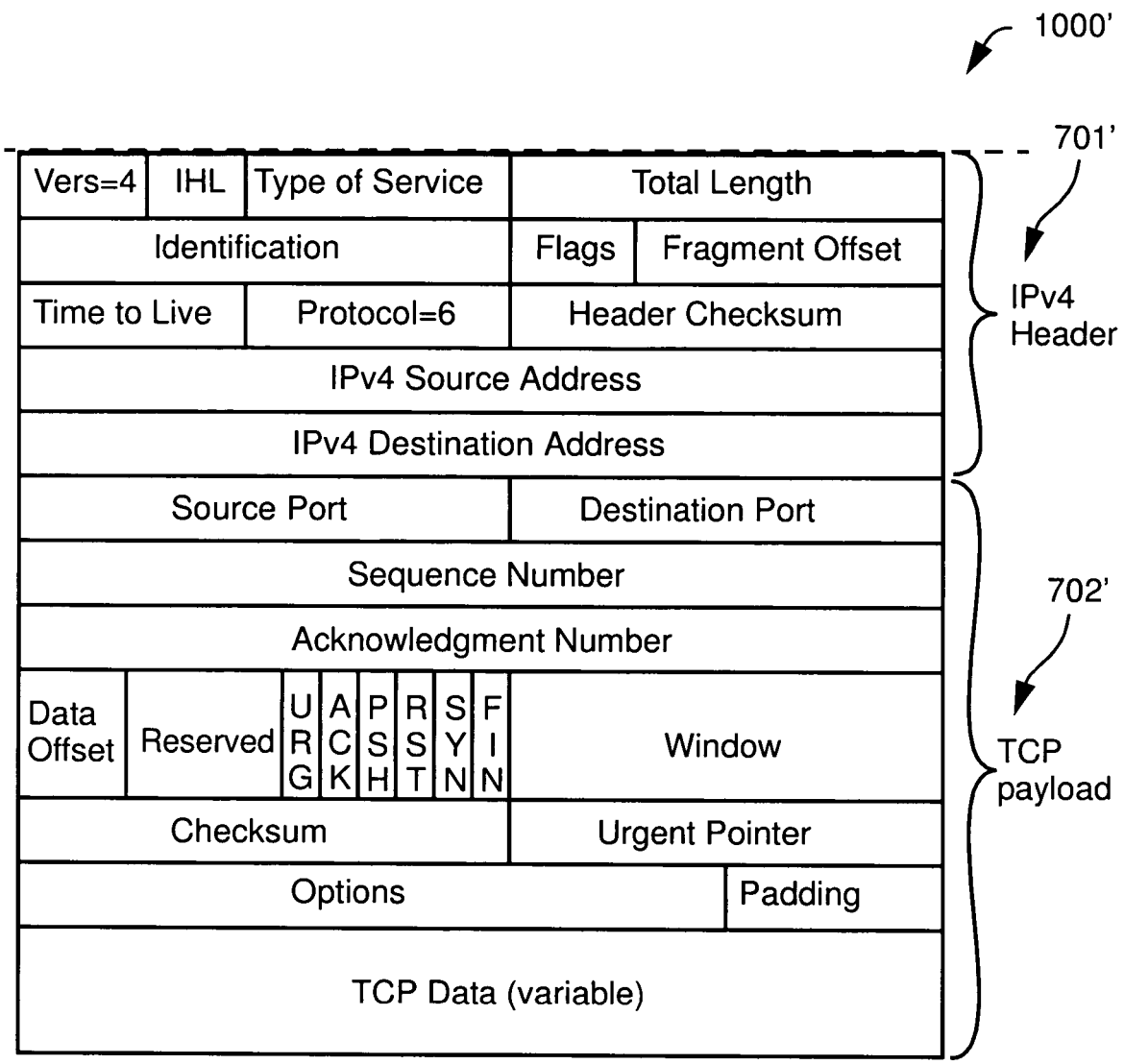

Thus, it is seen that the Type 0 routing header 902 changes as the IPv6 packet progresses towards its final destination through the network 807. When the packet is received at the final destination, it is in the form shown in FIGS. 16A and 16B. Here the final IPv6 destination address is to be found in the IPv6 base header 1001. Furthermore, the first, second and third intermediate addresses are to be found in the IPv6 Type 0 routing header 1002. Finally, the "segments left" field has been decremented to a value of 0. FIGS. 16A and 16B thus show the tunnel packet of FIGS. 15A and 15B upon arrival at the destination computer 809 of FIG. 1.

When the source computer system 801 calculates the authentication value for the IPv6 packet being sent from the computer 801, it must predict the value of the Type 0 routing header which will be received at the destination computer system 809. Thus, when adding the Type 0 routing header to the originating IPv6 packet, the source computer system 801 uses the Type 0 routing header shown in FIG. 17 to create the IPv6 packet. This is identical to 902 in FIG. 15A. This is called the "Extension Header" stored in the memory region 304 in FIG. 3. However, the Type 0 routing header shown in FIG. 18 is used to calculate the authentication value 903 for the IPv6 packet which is sent by the computer system 801. This is called the "Predicted Extension Header" stored in the memory region 305 in FIG. 3.

Figure 17:
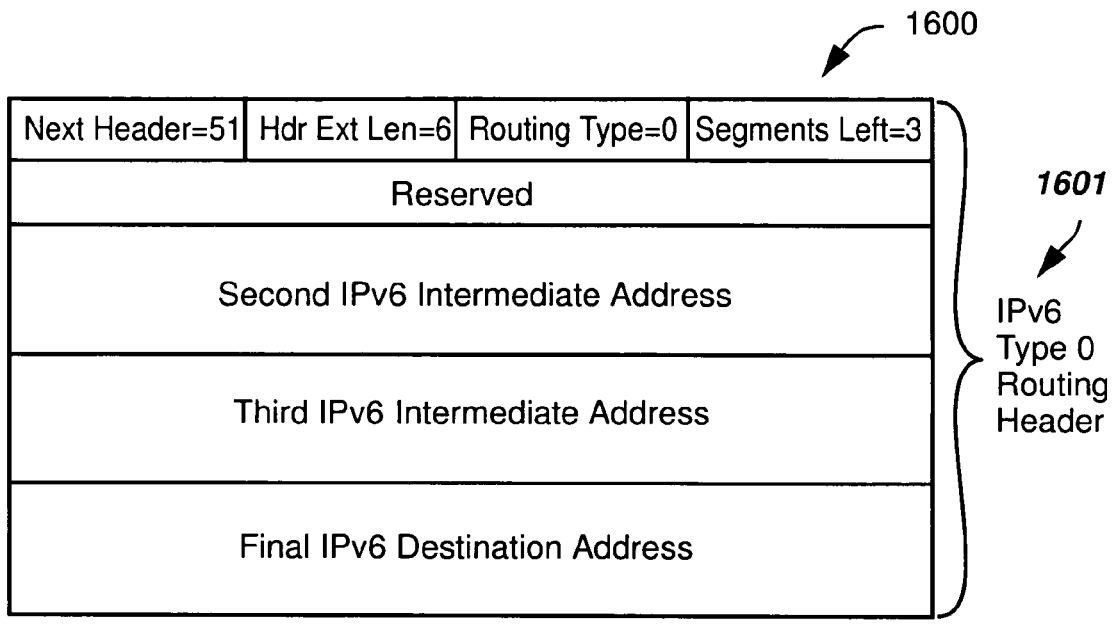
FIG. 17 shows the (Type 0 Routing) extension header used to create the IPv6 tunnel packet of FIGS. 15A and 15B.
Figure 18:
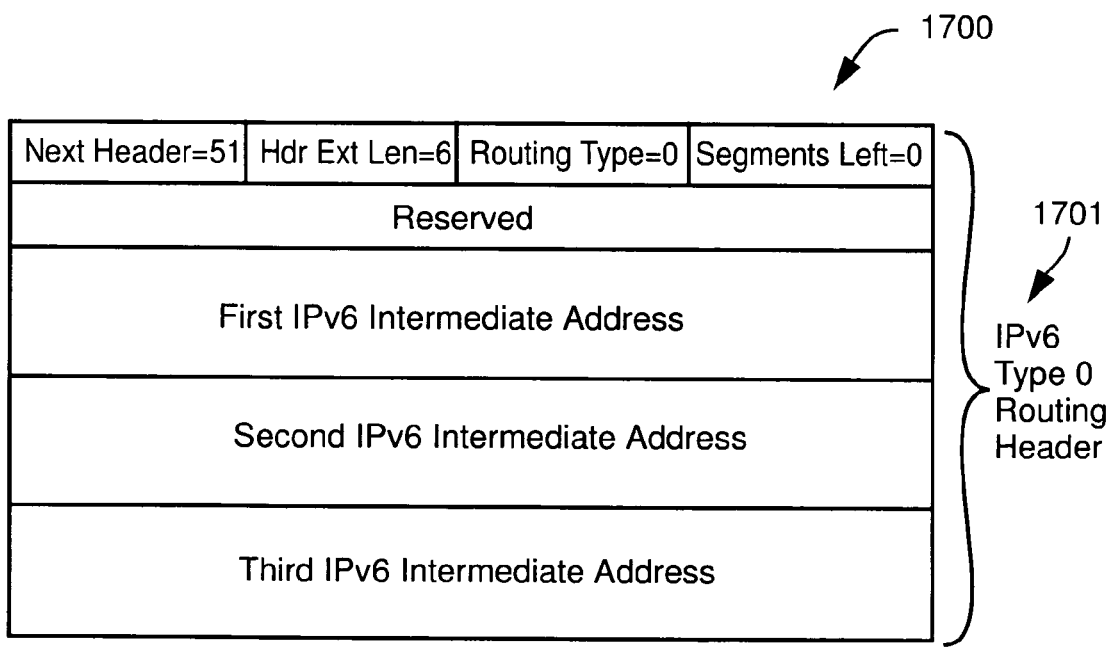
FIG. 18 shows the (Type 0 Routing) extension header used to calculate the authentication value for the aforementioned tunnel packet.

Accordingly, both the routing header 1601 in FIG. 17 and the routing header 1701 in FIG. 18 are stored in the extension header template memory 205. More particularly, the routing header 1601 is stored in the extension header memory partition 304 and the routing header 1701 is stored in the predicted extension header memory partition 305.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

I claim:

1. A method of processing IP packets, the method comprising the steps of:
    defining a plurality of sets of packet fields;
    storing the sets of defined packet fields in a memory;
    determining if a current IP packet is intended to be processed;
    identifying the process to be applied to the current IP packet;
    selecting, depending on an attribute of the identified process, at least one of the stored sets of defined packet fields; and
    operating upon the current IP packet, using the at least one set of selected packet fields, to form a processed IP packet,
    wherein each said set of defined packet fields comprises an extension header, and
    wherein each said set of defined packet fields further comprises at least one predicted extension header associated with the extension header.

2. A method according to claim 1, wherein a said predicted extension header is formed by:
    modifying predictable fields of the extension header to form an initial predicted extension header; and
    changing unpredictable fields of the initial predicted extension header to form the predicted extension header.

3. A method according to claim 1, wherein the determining and identifying steps are performed with reference to a security policy for the IP packets, and the method further comprises creating a security association for the current IP packet, wherein the selecting and operating steps depend upon the security association.

4. A method according to claim 1, wherein if the current IP packet is to be authenticated, then the operating step comprises the steps of:
    acquiring a copy of the stored extension header;
    incorporating the copy of the stored extension header into the current IP packet, to form an intermediate IP packet;
    determining an authentication field of the intermediate IP packet; and
    incorporating the authentication field into the intermediate IP packet to form the processed IP packet.

5. A method according to claim 1, wherein, if the current IP packet is to be tunnelled and authenticated, then the operating step comprises the steps of:
    acquiring a copy of the stored extension header and a copy of the stored predicted extension header;
    constructing an intermediate IP packet using the copy of the stored predicted extension header;
    determining an authentication field of the intermediate IP packet; and
    incorporating the authentication field and the copy of the stored extension header into the current IP packet to form the processed IP packet.

6. An apparatus for processing IP packets, the apparatus comprising:
    defining means that defines a plurality of sets of packet fields;
    storing means that stores the sets of defined packet fields in a memory;
    determining means that determines if a current IP packet is intended to be processed;
    identifying means that identifies the process to be applied to the current IP packet;

selecting means that selects, depending on an attribute of the identified process, at least one of the stored sets of defined packet fields; and operating means that operates upon the current IP packet, using the at least one set of selected packet fields, to form a processed IP packet, wherein each said set of defined packet fields comprises an extension header and at least one predicted extension header associated with the extension header, said apparatus further comprising:

modifying means that modifies predictable fields of the extension header to form an initial predicted extension header; and changing means that changes unpredictable fields of the initial predicted extension header to form the predicted extension header.

7. An apparatus according to claim 6, further comprising:
means wherein, (a) if the current IP packet is to be authenticated, then the operating means comprises:

acquiring means that acquires a copy of the stored extension header;

incorporating means that incorporates the copy of the stored extension header into the current IP packet, to form an intermediate IP packet;

determining means that determines an authentication field of the intermediate IP packet; and incorporating means that incorporates the authentication field into the intermediate IP packet to form the processed IP packet; and (b) if the current IP packet is to be tunnelled and authenticated, then the operating means comprises:

acquiring means that acquires a copy of the stored extension header and a copy of the stored predicted extension header;

constructing means that constructs an intermediate IP packet using the copy of the stored predicted extension header;

determining means that determines an authentication field of the intermediate IP packet; and incorporating means that incorporates the authentication field and the copy of the stored extension header into the current IP packet to form the processed IP packet.

8. A computer-readable storage medium on which is stored a computer program for executing a method of processing IP packets, said computer program comprising:

code for defining a plurality of sets of packet fields;

code for storing the sets of defined packet fields in a memory;

code for determining if a current IP packet is intended to be processed;

code for identifying the process to be applied to the current IP packet;

code for selecting, depending on an attribute of the identified process, at least one of the stored sets of defined packet fields; and code for operating upon the current IP packet, using the at least one set of selected packet fields, to form a processed IP packet, wherein each said set of defined packet fields comprises an extension header and at least one predicted extension header associated with the extension header, said computer program further comprising:

code for modifying predictable fields of the extension header to form an initial predicted extension header; and code for changing unpredictable fields of the initial predicted extension header to form the predicted extension header.

9. A computer-readable medium according to claim 8 further comprising:

code wherein, (a) if the current IP packet is to be authenticated, then the code for operating comprises:

code for acquiring a copy of the stored extension header;

code for incorporating the copy of the stored extension header into the current IP packet, to form an intermediate IP packet;

code for determining an authentication field of the intermediate IP packet; and code for incorporating the authentication field into the intermediate IP packet to form the processed IP packet; and (b) if the current IP packet is to be tunnelled and authenticated, then the code for operating comprises:

code for acquiring a copy of the stored extension header and a copy of the stored predicted extension header;

code for constructing an intermediate IP packet using the copy of the stored predicted extension header;

code for determining an authentication field of the intermediate IP packet; and code for incorporating the authentication field and the copy of the stored extension header into the current IP packet to form the processed IP packet.

* * * * *